US012809223B2

(12) United States Patent
Lo et al.

(10) Patent No.: US 12,809,223 B2
(45) Date of Patent: Nov. 24, 2026

(54) SEMICONDUCTOR PHOTONICS DEVICES AND METHODS OF FORMING THE SAME

(71) Applicant: Taiwan Semiconductor Manufacturing Company, Ltd., Hsinchu (TW)

(72) Inventors: Wen-Shun Lo, Hsinchu County (TW); Chia-Wei Chiang, Hsinchu County (TW); Sheng Kai Yeh, Taichung City (TW); Chi-Yuan Shih, Hsinchu (TW); YingKit Felix Tsui, Cupertino, CA (US); Shih-Fen Huang, Jhubei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 299 days.

(21) Appl. No.: 18/421,365

(22) Filed: Jan. 24, 2024

(65) Prior Publication Data

US 2025/0237925 A1 Jul. 24, 2025

(51) Int. Cl.
*G02F 1/025* (2006.01)
*G02F 1/225* (2006.01)

(52) U.S. Cl.
CPC ............ *G02F 1/2257* (2013.01); *G02F 1/025* (2013.01)

(58) Field of Classification Search
CPC ............................... G02F 1/025; G02F 1/2257
USPC ........................................................ 385/1–3
See application file for complete search history.

(56) References Cited

U.S. PATENT DOCUMENTS 8,737,772 B2 * 5/2014 Dong ...................... G02F 1/025 385/2
8,938,134 B2 1/2015 Chen
10,151,941 B2 * 12/2018 Ishikura .................. G02F 1/025
11,686,991 B1 * 6/2023 Tu ........................... G02F 1/212 385/2
12,242,142 B2 * 3/2025 Yuan ..................... G02F 1/0151
2013/0188902 A1 * 7/2013 Gardes ................. H10H 20/855 438/37
2014/0341497 A1 * 11/2014 Liu ......................... G02F 1/015 438/31
2016/0313577 A1 * 10/2016 Sun ......................... G02F 1/025
(Continued)

FOREIGN PATENT DOCUMENTS

CN 103226252 B * 5/2016 ............. G02F 1/025
TW 201432346 A 8/2014
(Continued)

OTHER PUBLICATIONS

Pending U.S. Appl. No. 18/325,739, filed May 30, 2023, and entitled “Semiconductor Photonics Device and Methods of Formation”.

*Primary Examiner* — Robert Tavlykaev
(74) *Attorney, Agent, or Firm* — Harrity & Harrity, LLP

(57) ABSTRACT

An optical modulator structure in a photonic integrated circuit includes a U-shaped P-N junction at an optical mode of the optical modulator structure (e.g., an area of the optical modulator structure in which light is generated). The U-shaped P-N junction provides increased area of overlap of the P-N junction at the optical mode relative to another type of junction, such as a horizontal junction or an I-shaped junction. The increased area of overlap enables the optical modulator structure to achieve a greater modulation efficiency.

20 Claims, 30 Drawing Sheets

(56) References Cited

U.S. PATENT DOCUMENTS

| | | | |
|---|---|---|---|
| 2017/0254955 | A1 | 9/2017 | Poon et al. |
| 2020/0073197 | A1 | 3/2020 | Liu et al. |
| 2021/0373363 | A1 | 12/2021 | Zhou et al. |
| 2023/0408762 | A1 | 12/2023 | Cho et al. |

FOREIGN PATENT DOCUMENTS

| | | | | |
|---|---|---|---|---|
| WO | WO 2016/165608 | A1 * | 10/2016 | ............. G02F 1/025 |
| WO | 2020214184 | A1 | 10/2020 | |

* cited by examiner

SEMICONDUCTOR PHOTONICS DEVICES AND METHODS OF FORMING THE SAME

BACKGROUND

A semiconductor device may include a photonic integrated circuit that is configured to use optical signals for high speed and secure data transmission between integrated circuits and/or semiconductor dies of the semiconductor device. Optical signals may enable high performance computing system to continue to rapidly scale in performance to satisfy increasing demands for telecommunications (e.g., 5G, 6G, and beyond), machine learning, artificial intelligence, and/or data center applications, among other examples.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
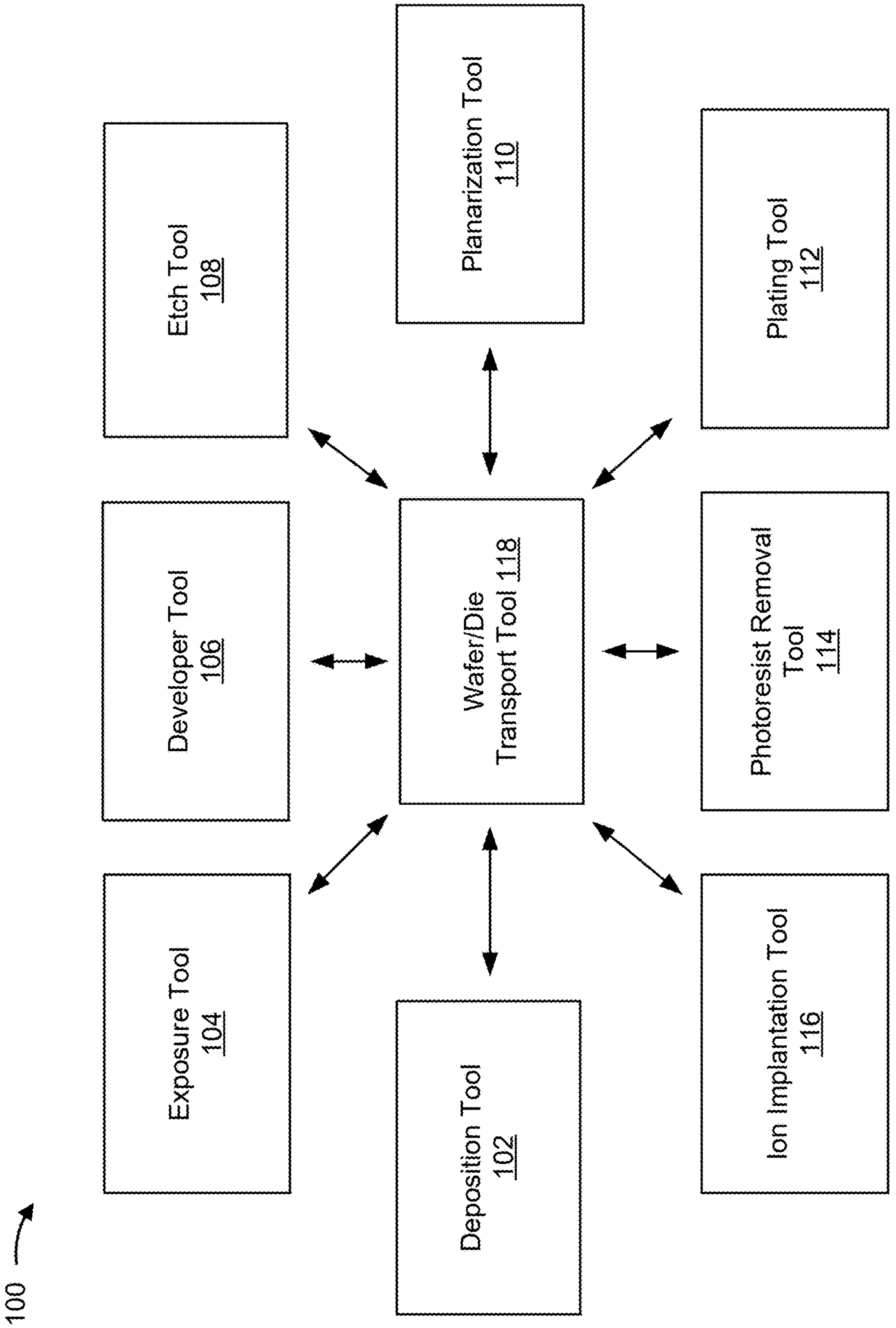
FIG. 1 is a diagram of an example environment in which systems and/or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An optical signal may be transferred through a waveguide in the photonic integrated circuit. The waveguide enables confinement of the optical signal, which may reduce optical loss and increase propagation efficiency for the optical signal. Data may be encoded into an optical signal by modulating light into optical pulses in an optical modulator in the photonic integrated circuit. An optical modulator may include a P-N junction that converts an electrical signal into optical signal with a voltage signal modulation applied into the P-N junction. When a voltage is applied to the P-N junction, the junction depletion width will be changed, resulting in changes in electrons and holes concentration within the waveguide. The changes of electrons and holes concentration lead to changes of an effective refractive index of the waveguide, and the changes of the effective refractive index change light intensity within the waveguide. In other words, the voltage signal causes change to the optical signal.

Increasing modulation speed of the photonic integrated circuit may increase bandwidth and/or data transfer rates for the optical signal. In some cases, optical bandwidth and/or electrical bandwidth of the photonic integrated circuit may be increased by reducing electron/hole lifetime in the waveguide and/or introducing high doses of impurities into the region optically connecting the waveguide and the optical modulator.

However, reducing the electron/hole lifetime in the waveguide may result in reduced Q-factors for the photonic integrated circuit, which may increase a full-width at half-maximum (FWHM) resonant wavelength line shape for the optical modulator. An increased FWHM resonant wavelength line shape for the optical modulator may reduce the optical modulation amplitude of the optical modulator, which may result in an increase in bit error rate at a receiver that is to receive the optical signal generated by the optical modulator.

Some implementations described herein provide techniques and apparatuses for an optical modulator, in a photonic integrated circuit, that includes a U-shaped P-N junction. The U-shaped P-N junction includes a p-type portion that overlaps with an n-type portion on both a first side and a second side opposite the first side. Accordingly, the n-type portion includes a first volume that contacts a top side of the p-type portion, and a second volume that contacts a bottom side of the p-type portion.

The U-shaped P-N junction provides increased area of overlap between the junction and an optical mode (e.g., relative to a horizontal junction or an I-shaped junction), which may enable the optical modulator to achieve a greater modulation efficiency due to variation in charge carrier concentration around the U-shaped P-N junction. The greater modulation efficiency may result in an increased modulation amplitude for the optical modulator. Greater modulation amplitude results in reduced bit error rates at a receiver that is to receive an optical signal generated by the optical modulator, particularly in high bandwidth applications such as telecommunications (e.g., 5G, 6G, and beyond), machine learning, artificial intelligence, and/or data center applications, among other examples.

FIG. 1 is a diagram of an example environment 100 in which systems and/or methods described herein may be implemented. As shown in FIG. 1, environment 100 may include a plurality of semiconductor processing tools 102-116 and a wafer/die transport tool 118. The plurality of semiconductor processing tools 102-116 may include a deposition tool 102, an exposure tool 104, a developer tool 106, an etch tool 108, a planarization tool 110, a plating tool 112, a photoresist removal tool 114, an ion implantation tool 116, and/or another semiconductor processing tool. The tools included in the example environment 100 may be included in a semiconductor clean room, a semiconductor foundry, a semiconductor processing and/or manufacturing facility, or another location.

The deposition tool 102 is a semiconductor processing tool that includes a semiconductor processing chamber and one or more devices capable of depositing various types of materials onto a substrate. In some implementations, the deposition tool 102 includes a spin coating tool that is capable of depositing a photoresist layer on a substrate such as a wafer. In some implementations, the deposition tool 102 includes a chemical vapor deposition (CVD) tool such as a plasma-enhanced CVD (PECVD) tool, a low pressure CVD (LPCVD) tool, a high-density plasma CVD (HDP-CVD) tool, a sub-atmospheric CVD (SACVD) tool, an atomic layer deposition (ALD) tool, a plasma-enhanced atomic layer deposition (PEALD) tool, an epitaxy tool, or another type of CVD tool. In some implementations, the deposition tool 102 includes a physical vapor deposition (PVD) tool, such as a sputtering tool or another type of PVD tool. In some implementations, the example environment 100 includes a plurality of types of deposition tools 102.

The exposure tool 104 is a semiconductor processing tool that is capable of exposing a photoresist layer to a radiation source, such as an ultraviolet light (UV) source (e.g., a deep UV light source, an extreme UV light (EUV) source, and/or the like), an x-ray source, an electron beam (e-beam) source, and/or the like. The exposure tool 104 may expose a photoresist layer to the radiation source to transfer a pattern from a photomask to the photoresist layer. The pattern may include one or more semiconductor device layer patterns for forming one or more semiconductor devices, may include a pattern for forming one or more structures of a semiconductor device, may include a pattern for etching various portions of a semiconductor device, and/or the like. In some implementations, the exposure tool 104 includes a scanner, a stepper, or a similar type of exposure tool.

The developer tool 106 is a semiconductor processing tool that is capable of developing a photoresist layer that has been exposed to a radiation source to develop a pattern transferred to the photoresist layer from the exposure tool 104. In some implementations, the developer tool 106 develops a pattern by removing unexposed portions of a photoresist layer. In some implementations, the developer tool 106 develops a pattern by removing exposed portions of a photoresist layer. In some implementations, the developer tool 106 develops a pattern by dissolving exposed or unexposed portions of a photoresist layer through the use of a chemical developer.

The etch tool 108 is a semiconductor processing tool that is capable of etching various types of materials of a substrate, wafer, or semiconductor device. For example, the etch tool 108 may include a wet etch tool, a dry etch tool, and/or the like. In some implementations, the etch tool 108 includes a chamber that is filled with an etchant, and the substrate is placed in the chamber for a particular time period to remove particular amounts of one or more portions of the substrate. In some implementations, the etch tool 108 may etch one or more portions of the substrate using a plasma etch or a plasma-assisted etch, which may involve using an ionized gas to isotropically or directionally etch the one or more portions.

The planarization tool 110 is a semiconductor processing tool that is capable of polishing or planarizing various layers of a wafer or semiconductor device. For example, a planarization tool 110 may include a chemical mechanical planarization (CMP) tool and/or another type of planarization tool that polishes or planarizes a layer or surface of deposited or plated material. The planarization tool 110 may polish or planarize a surface of a semiconductor device with a combination of chemical and mechanical forces (e.g., chemical etching and free abrasive polishing). The planarization tool 110 may utilize an abrasive and corrosive chemical slurry in conjunction with a polishing pad and retaining ring (e.g., typically of a greater diameter than the semiconductor device). The polishing pad and the semiconductor device may be pressed together by a dynamic polishing head and held in place by the retaining ring. The dynamic polishing head may rotate with different axes of rotation to remove material and even out any irregular topography of the semiconductor device, making the semiconductor device flat or planar.

The plating tool 112 is a semiconductor processing tool that is capable of plating a substrate (e.g., a wafer, a semiconductor device, and/or the like) or a portion thereof with one or more metals. For example, the plating tool 112 may include a copper electroplating device, an aluminum electroplating device, a nickel electroplating device, a tin electroplating device, a compound material or alloy (e.g., tin-silver, tin-lead, and/or the like) electroplating device, and/or an electroplating device for one or more other types of conductive materials, metals, and/or similar types of materials.

The photoresist removal tool 114 is a semiconductor processing tool that is capable of removing remaining portions of a photoresist layer from a substrate after the etch tool 108 removes portions of the substrate. For example, the photoresist removal tool 114 may use a chemical stripper and/or another technique to remove a photoresist layer from a substrate.

The ion implantation tool 116 is a semiconductor processing tool that is capable of implanting ions into a substrate. The ion implantation tool 116 may generate ions in an arc chamber from a source material such as a gas or a solid. The source material may be provided into the arc chamber, and an arc voltage is discharged between a cathode and an electrode to produce a plasma containing ions of the source material. One or more extraction electrodes may be used to extract the ions from the plasma in the arc chamber and accelerate the ions to form an ion beam. The ion beam may be directed toward the substrate such that the ions are implanted below the surface of the substrate.

The wafer/die transport tool 118 may be included in a cluster tool or another type of tool that includes a plurality of processing chambers, and may be configured to transport substrates and/or semiconductor devices between the plurality of processing chambers, to transport substrates and/or semiconductor devices between a processing chamber and a buffer area, to transport substrates and/or semiconductor devices between a processing chamber and an interface tool such as an equipment front end module (EFEM), and/or to transport substrates and/or semiconductor devices between a processing chamber and a transport carrier (e.g., a front opening unified pod (FOUP)), among other examples. In some implementations, a wafer/die transport tool 118 may be included in a multi-chamber (or cluster) deposition tool 102, which may include a pre-clean processing chamber (e.g., for cleaning or removing oxides, oxidation, and/or other types of contamination or byproducts from a substrate and/or semiconductor device) and a plurality of types of deposition processing chambers (e.g., processing chambers for depositing different types of materials, processing chambers for performing different types of deposition operations).

In some implementations, one or more of the semiconductor processing tools 102-116 and/or the wafer/die transport tool 118 may perform one or more semiconductor processing operations described herein. For example, one or more of the semiconductor processing tools 102-116 and/or the wafer/die transport tool 118 may form, using a first mask, a first supporting region using a first dopant type and may form using a second mask, a second supporting region using a second dopant type. Additionally, one or more of the semiconductor processing tools 102-116 and/or the wafer/die transport tool 118 may dope, using a third mask, a first region with the first dopant type, a second region with the second dopant type that is under the first region, and a third region with the first dopant type that is under the second region. The first region, the second region, and the third region correspond to a P-N junction diode and form a U-shaped interface of the P-N junction diode.

The number and arrangement of tools shown in FIG. 1 are provided as one or more examples. In practice, there may be additional tools, fewer tools, different tools, or differently arranged tools than those shown in FIG. 1. Furthermore, two or more tools shown in FIG. 1 may be implemented within a single tool, or a single tool shown in FIG. 1 may be implemented as multiple, distributed tools. Additionally, or alternatively, a set of tools (e.g., one or more tools) of environment 100 may perform one or more functions described as being performed by another set of tools of environment 100.

Figure 2A:
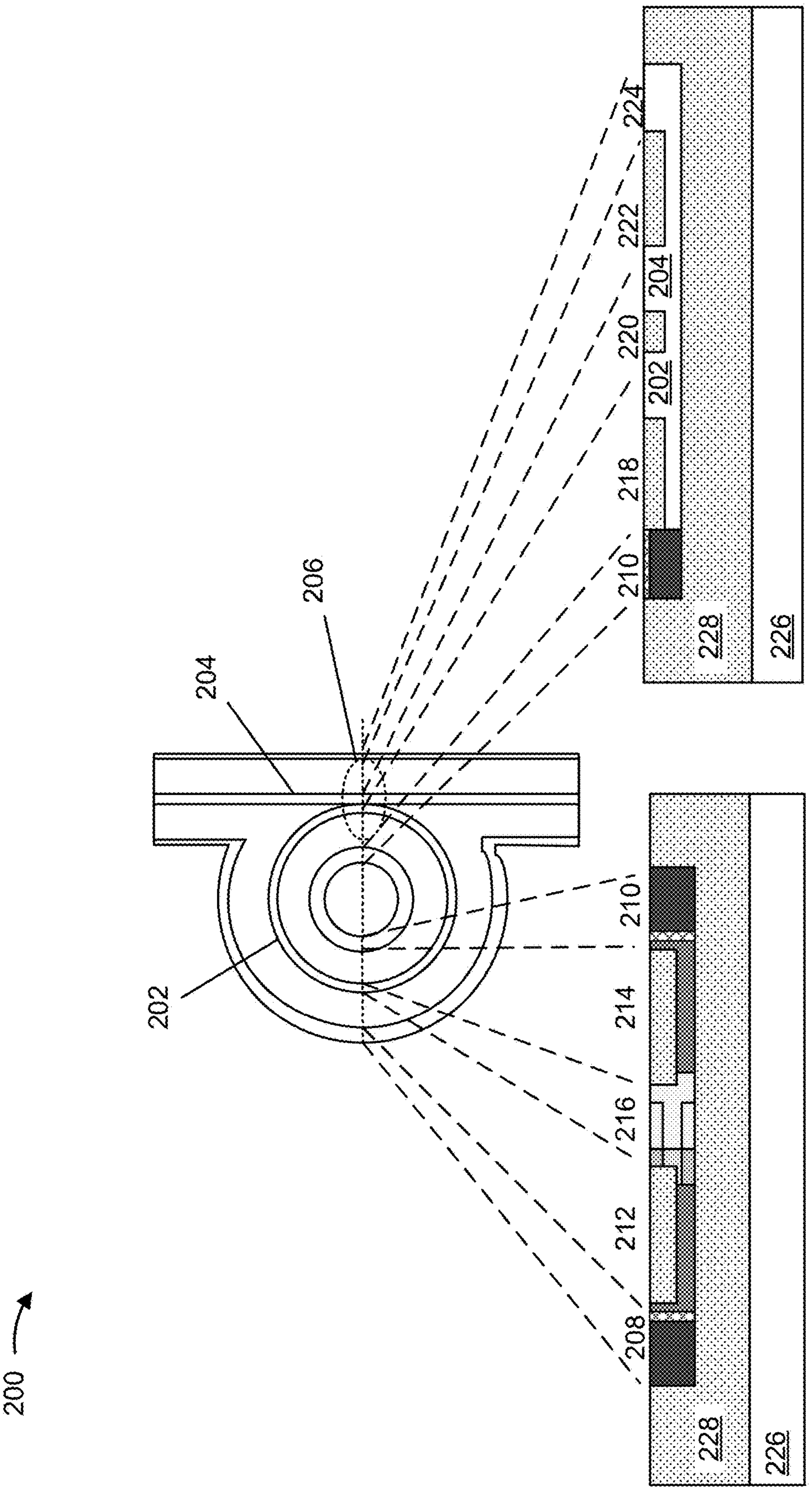
FIGS. 2A-2B are diagrams of example semiconductor devices described herein.

FIG. 2A is a diagram of an example semiconductor device 200 described herein. In particular, FIG. 2A illustrates a top-down view of the semiconductor device 200. The semiconductor device 200 may include a semiconductor photonics device and/or another type of semiconductor device that includes one or more photonic integrated circuits.

The semiconductor device 200 may be configured to use optical signals for high speed and secure data transmission between integrated circuits and/or semiconductor dies of the semiconductor device 200. Accordingly, the semiconductor device 200 may include an optical modulator structure 202 and a waveguide structure 204 coupled with the optical modulator structure 202 in a coupling region 206. An optical signal may be transferred through the waveguide structure 204 in the semiconductor device 200. The waveguide structure 204 enables confinement of the optical signal, which may reduce optical loss and increase propagation efficiency for the optical signal. Data may be encoded into an optical signal by modulating light into optical pulses in the optical modulator structure 202. The optical pulses are then transferred to the waveguide structure 204 for propagation to other regions of the semiconductor device 200. The optical modulator structure 202 and the waveguide structure 204 may be adjacent and/or side by side in the semiconductor device 200 to enable coupling of the optical signal from the optical modulator structure 202 to the waveguide structure 204 (and vice-versa for demodulation of an optical signal).

The optical modulator structure 202 may include an approximately circular-shaped structure or an approximately ring-shaped structure, and may be referred to as a micro-ring modulator (MRM). The optical modulator structure 202 may function as a resonance chamber and may modulate an input signal from an optical mode to generate an optical signal (e.g., a modulated light signal). The optical signal may couple to the waveguide structure 204 in the coupling region 206 based on the optical signal satisfying a threshold modulation frequency and/or based on the optical signal satisfying a threshold signal intensity. The waveguide structure 204 may facilitate propagation of the optical signal to another device or area in the semiconductor device 200.

As further shown in FIG. 2A, the optical modulator structure 202 may include a plurality of regions. For example, the optical modulator structure 202 may include a contact region 208 and an opposing contact region 210. The contact region 208 may be located at an outer perimeter of the optical modulator structure 202, and the contact region 210 may be located at an inner perimeter of the optical modulator structure 202. The contact region 208 and 210 may be regions of the optical modulator structure 202 that are electrically coupled and/or physically coupled with contacts of the semiconductor device 200.

The optical modulator structure 202 may further include a connection region 212 and a connection region 214. The connection region 212 may be electrically coupled and/or physically coupled with the contact region 208 and with a P-N junction diode 216 of the optical modulator structure 202. The connection region 212 may electrically couple the P-N junction diode 216 with the contact region 208. The connection region 214 may be electrically coupled and/or physically coupled with the contact region 210 and with the P-N junction diode 216 of the optical modulator structure 202. The connection region 214 may electrically couple the P-N junction diode 216 with the contact region 210.

The P-N junction diode 216 is located at an optical mode of the optical modulator structure 202. The P-N junction diode 216 includes a p-type region and an n-type region that are coupled at an interface. As described herein, the interface may be referred to as an U-shaped interface. The interface may be referred to as an U-shaped interface in that the interface includes at least two directional segments. For example, the interface may include an approximately vertical segment in which the p-type region and the n-type region are coupled, a first approximately horizontal segment in which the p-type region and the n-type region are coupled, and a second approximately horizontal segment in which the p-type region and the n-type region are coupled. The approximately horizontal segments may be parallel or at least substantially parallel (e.g., within a margin of error of 5° or) 10°. The connections between the approximately vertical segment and the approximately horizontal segments may be approximately 90-degree interfaces or similar angles such that the n-type region overlaps (e.g., is on top of) the p-type region (or the p-type region overlaps the n-type region) in the first approximately horizontal segment and that the p-type region overlaps (e.g., is on top of) the n-type region (or the n-type region overlaps the p-type region) in the second approximately horizontal segment. The U-shaped interface increases the area of overlap between the n-type region and the p-type region (e.g., increases the area of overlap of the P-N junction diode 216 and the optical mode), which may enable the optical modulator structure 202 to achieve a greater modulation efficiency due to variation in charge carrier concentration around the U-shaped interface. The greater modulation efficiency may result in an increased modulation amplitude for the optical modulator structure 202. This may result in reduced bit error rates at a receiver that is to receive an optical signal generated by the optical modulator structure 202.

As further shown in FIG. 2A, in the coupling region 206, the optical modulator structure 202 may include the contact region 210, a connection region 218 that couples the contact region 210 with the optical modulator structure 202, a connection region 220 that couples the optical modulator structure 202 with the waveguide structure 204, and a connection region 222 that couples the waveguide structure 204 with an outer region 224. In the semiconductor device 200, the optical modulator structure 202 and the waveguide structure 204 are partially integrated in the connection region 220. Other examples may include the optical modulator structure 202 as separate from the waveguide structure 204.

The semiconductor device 200 may include a substrate 226 and a dielectric region 228 in which the optical modulator structure 202 and the waveguide structure 204 are included. The substrate 226 may be formed of silicon (Si), a material including silicon, a III-V compound semiconductor material such as gallium arsenide (GaAs), and/or another type of semiconductor material. The dielectric region 228 may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material. The waveguide structure 204 may include an undoped semiconductor structure (e.g., an undoped silicon structure) in the dielectric region 228. The optical modulator structure 202 may include one or more doped semiconductor regions, such as one or more p-type regions (e.g., semiconductor regions, such as silicon regions, that include one or more p-type dopants) and one or more n-type regions (e.g., semiconductor regions, such as silicon regions, that include one or more n-type dopants), in the dielectric region.

Figure 2B:
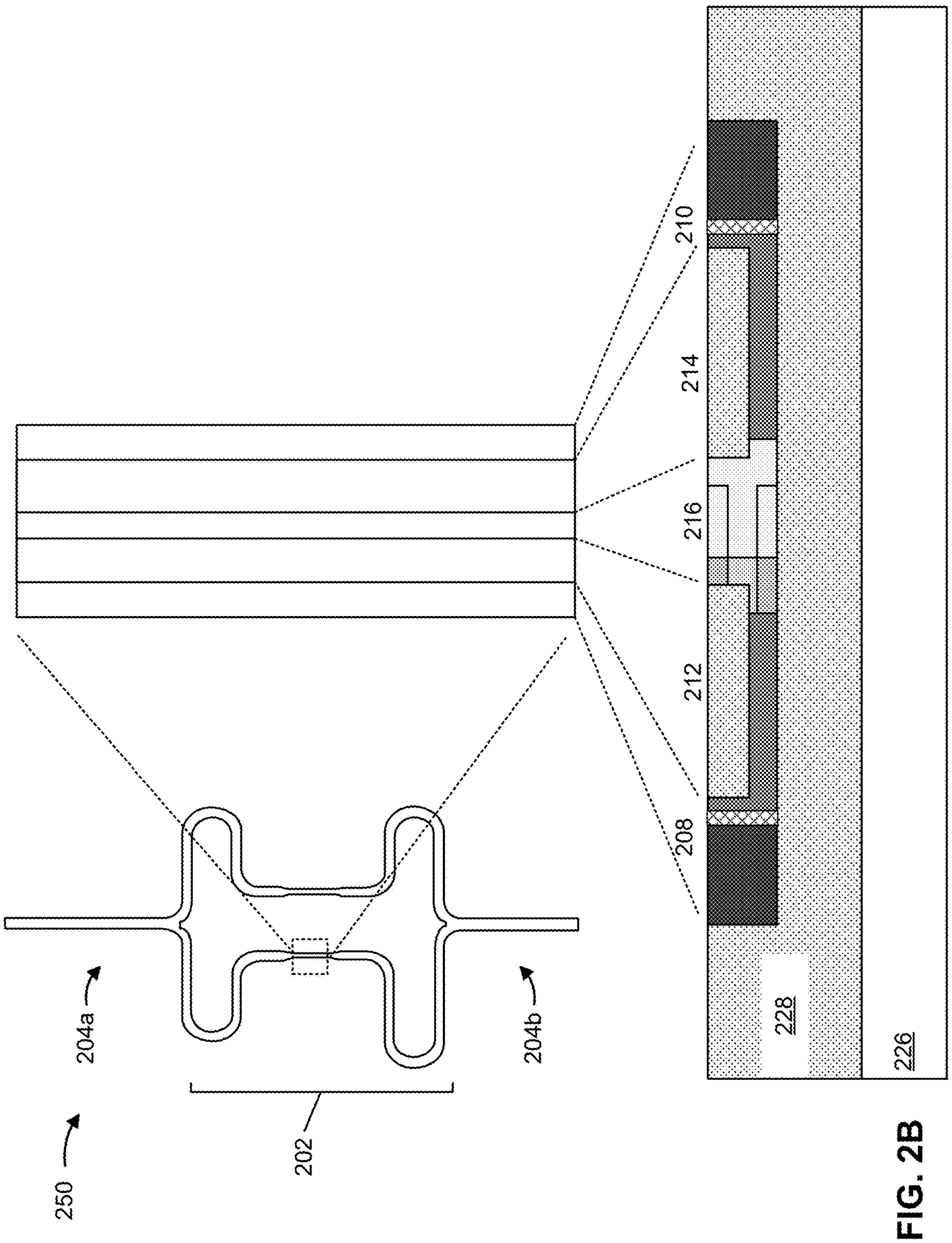

FIG. 2B is a diagram of an example semiconductor device 250 described herein. In particular, FIG. 2B illustrates a top-down view of the semiconductor device 250. The semiconductor device 250 may include a semiconductor photonics device and/or another type of semiconductor device that includes one or more photonic integrated circuits. In particular, the semiconductor device 250 may include an optical modulator structure 202 that is coupled with an input waveguide 204*a* and an output waveguide 204*b*. The optical modulator structure 202 may include a Mach-Zehnder modulator (MZM) structure. Moreover, the optical modulator structure 202 may include a U-shaped interface in the P-N junction diode 216 of the optical modulator structure 202, as described in connection with FIGS. 3A and 3B. The optical modulator structure 202 included in the semiconductor device 250 may be formed using techniques described in connection with FIGS. 4A-4M and/or FIGS. 5A-5J.

The MZM structure of the optical modulator structure 202 enables the optical modulator structure 202 to generate a modulated light output from input light that is provided to the optical modulator structure 202 through the input waveguide 204*a*. The input light may be split and provided to different arms of the optical modulator structure 202 and modulated in the optical mode of the P-N junction diode 216. This enables the input light to be phase modulated by multiple phase shifters in the optical modulator structure 202 and then recombined in the output waveguide 204*b* to form the modulated light output.

As indicated above, FIGS. 2A and 2B are provided as examples. Other examples may differ from what is described with regard to FIGS. 2A and 2B.

Figure 3A:
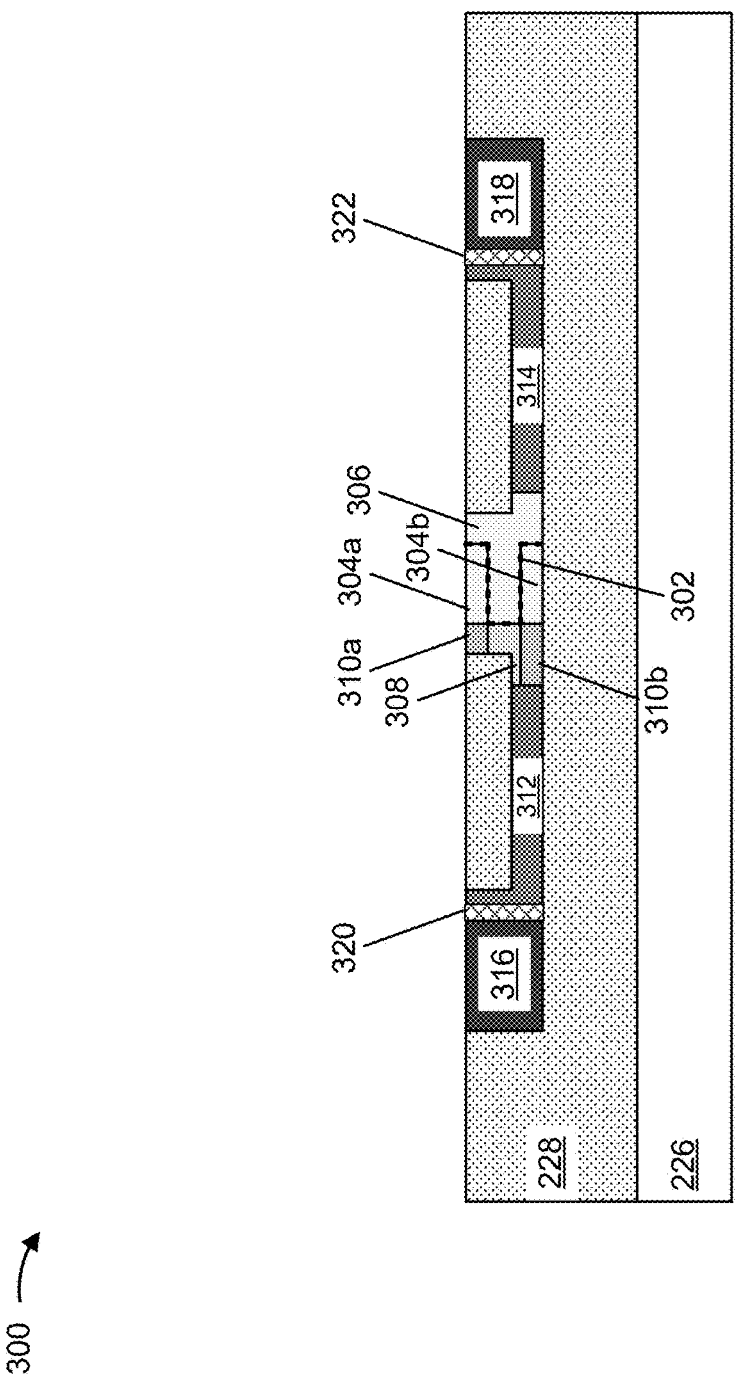
FIGS. 3A-3B are diagrams of example semiconductor structures described herein.

FIG. 3A is a diagram of an example implementation 300 of an optical modulator structure 202 described herein. The optical modulator structure 202 may be included in a semiconductor photonics circuit of a semiconductor photonics device, such as the semiconductor device 200 of FIG. 2A or a semiconductor device 250 of FIG. 2B, among other examples.

FIG. 3A illustrates a cross-sectional view of the optical modulator structure 202. The optical modulator structure 202 may be included in the dielectric region 228. The dielectric region 228 may be included over and/or on the substrate 226 and may include one or more dielectric layers, one or more shallow trench isolation (STI) regions, one or more etch stop layers (ESLs), and/or one or more other dielectric structures.

As further shown in FIG. 3A, the optical modulator structure 202 may include a plurality of doped semiconductor regions. The plurality of doped regions may form an interface 302 of a P-N junction diode. As shown in FIG. 3A, the interface 302 may be a U-shaped interface.

The plurality of doped regions may include silicon (and/or another semiconductor material) that is doped with one or more types of dopants, such as n-type dopants and/or p-type dopants. The optical modulator structure 202 may include a region 304*a* and a region 304*b*, of the P-N junction diode, that includes a first dopant type. The optical modulator structure 202 may further include a region 306, of the P-N junction diode, that includes a second dopant type (e.g., that is different from the first dopant type). The region 306 may be located between the regions 304*a* and 304*b* and may be coupled with the regions 304*a* and 304*b* at the interface 302.

The optical modulator structure 202 may further include a region 308 of the P-N junction diode. The region 308 may be adjacent to the region 306 and may include the first dopant type. The optical modulator structure 202 may include a region 310*a* and a region 310*b* of the P-N junction diode. The regions 310*a* and 310*b* may include the first dopant type. The region 310*a* may be located adjacent to the region 304*a*, and the region 310*b* may be located adjacent to the region 304*b*. The region 308 may be located under and/or below the region 310*a* and may be located over and/or on the region 310*b*.

In some implementations, the region 306 may correspond to a first region of the P-N junction diode, and the regions 304*a*, 304*b*, and 308 may be segments of a second region of the P-N junction diode. For example, the region 306 may include a p-type region (where the second dopant type may be a p-type dopant), and the regions 304*a*, 304*b*, and 308 may include an n-type region (where the first dopant type may be an n-type dopant) such that the n-type region surrounds the p-type region. The p-type dopant may include p-type ions of a p-type material (e.g., boron (B) or germanium (Ge), among other examples). The n-type dopant may include n-type ions of an n-type material (e.g., phosphorous (P) or arsenic (As), among other examples). Alternatively, the region 306 may include an n-type region (where the second dopant type may be a n-type dopant), and the regions 304*a*, 304*b*, and 308 may include an p-type region (where the first dopant type may be a p-type dopant) such that the p-type region surrounds the n-type region. The interface 302 may be a U-shaped interface (or two-dimensional interface) between the first region and the second region of the P-N junction diode that includes a first segment between the regions 304*b* and 306, a second segment between the regions 308 and 306, and a third segment between the regions 304*a* and 306. The U-shaped interface may correspond to a sideways "U" (e.g., a "U" that is rotated approximately 90 degrees) in a cross-section view of the interface 302, where the first segment and the third segment are parallel with the surface of the substrate 226, and the second segment is connected to the first segment and the third segment at opposing ends of the second segment. The second segment may be approximately perpendicular to the surface of the substrate 226 and perpendicular to the first and third segments. The U-shaped interface may alternatively be referred to as a C-shaped interface. Additionally, or alternatively, the interface 302 may include a sideways "J" shape in a cross-section view of the interface 302, where the first segment is longer than the third segment or the third segment is longer than the first segment.

As further shown in FIG. 3A, the regions 304*a* and 304*b* both contact the region 306 along approximately vertical segments in addition to the first and third segments (that are approximately horizontal). For example, by using techniques as described in connection with FIGS. 5A-5J, the approximately vertical segments are formed and further increase a surface area associated with the interface 302.

In some implementations, a ratio of a height of the supporting region 312 to a height of the P-N junction diode (that is, a height of the regions 304*a*, 304*b*, and 306 at the interface 302) is in a range from approximately 0.25 to approximately 0.40. For example, when the height of the P-N junction diode may be 270 nanometers (nm), the height of the supporting region 312 may be in a range from approximately 70 nm to approximately 110 nm. Selecting a ratio of at least 0.25 reduces electrical resistance from the contact region 316 to the P-N junction diode—a smaller ratio would inhibit the flow of charge carriers. Selecting a ratio of no more than 0.40 reduces light loss caused by the supporting region 312—a larger ratio would cause more light to absorb into the supporting region 312 and be lost. A similar ratio is applicable to the supporting region 314. However, other values and/or ranges for the ratio, the height of the supporting region 312, and/or the height of the P-N junction diode are within the scope of the present disclosure.

In some implementations, a ratio of a height of the region 306 (at the interface 302) to a height of the P-N junction diode may be in a range from approximately 0.3 to approximately 0.5. For example, when the height of the P-N junction diode may be 270 nm, the height of the region 306 may be in a range from approximately 90 nm to approximately 130 nm. Selecting a ratio of at least 0.3 improves modulation efficiency at the P-N junction diode—a smaller ratio would result in an insufficient number of charge carriers from the region 306. Selecting a ratio of no more than 0.5 improves modulation efficiency at the P-N junction diode—a larger ratio would result in an insufficient number of charge carriers from the regions 304*a* and 304*b*. However, other values and/or ranges for the ratio, the height of the region 306, and/or the height of the P-N junction diode are within the scope of the present disclosure.

In some implementations, a ratio of a height of the region 304*a* (at the interface 302) to a height of the P-N junction diode may be in a range from approximately 0.22 to approximately 0.37. For example, when the height of the P-N junction diode may be 270 nm, the height of the region 304*a* may be in a range from approximately 60 nm to approximately 100 nm. Selecting a ratio of at least 0.22 improves modulation efficiency at the P-N junction diode—a smaller ratio would result in an insufficient number of charge carriers from the region 304*a*. Selecting a ratio of no more than 0.37 improves modulation efficiency at the P-N junction diode—a larger ratio would result in an insufficient number of charge carriers from the region 306. Therefore, a thickness of the region 306 (at the interface 302) may be larger than a thickness of the region 304*a* (at the interface 302) to ensure a sufficient number of charge carriers from the region 306 at the interface 302. Moreover, a similar ratio is applicable to the region 304*b*. Some implementations, however, may include the region 304*a* being thinner than the region 304*b*. The region 304*b* may be thicker than the region 304*a* because more charge carriers are accumulated at a portion of the region 306 overlapping with the region 304*b* than at a portion of the region 306 overlapping with the region 304*a*. As a result, the region 304*b* may be thicker to ensure a sufficient number of charge carriers from the region 304*b* at the interface 302. Additionally, a thickness of the region 306 (at the interface 302) may be larger than a thickness of the region 304*b* (at the interface 302) to ensure a sufficient number of charge carriers from the region 306 at the interface 302. In some implementations, a thickness of the region 306 (at the interface 302) may be larger than a sum of the thickness of the region 304*a* and the thickness of the region 304*b* because the region 306 also interfaces with the region 308 (and thus should provide more charge carriers than the regions 304*a* and 304*b*). However, other values and/or ranges for the ratio, the height of the region 304*a*, and/or the height of the P-N junction diode are within the scope of the present disclosure.

In some implementations, a ratio of a width of the region 310*a* (and similarly a width of the region 308 at a top portion of the region 308) to a width of the P-N junction diode (that is, a width of the regions 310*a*, 304*a*, and 306 along a top surface of the dielectric region 228) may be in a range from approximately 0.12 to approximately 0.50. For example, when the width of the P-N junction diode may be 400 nm, the width of the region 310*a* may be in a range from approximately 50 nm to approximately 200 nm. Selecting a ratio of at least 0.12 reduces electrical resistance from the contact region 316 to the P-N junction diode—a smaller ratio would inhibit the flow of charge carriers. Selecting a ratio of no more than 0.50 improves modulation efficiency—a larger ratio would reduce a surface area of the interface 302 and inhibit modulation. A similar ratio is applicable to a width of a portion of the region 306 that is non-overlapping with the region 304*a*. However, other values and/or ranges for the ratio, the width of the region 310*a*, and/or the width of the P-N junction diode are within the scope of the present disclosure.

The optical modulator structure 202 may further include a supporting region 312 that is physically coupled and/or electrically coupled with the regions 308 and 310*b*. The supporting region 312 may include the first dopant type such that the regions 304*a*, 304*b*, 308, 310*a*, and 310*b* include the same dopant type (e.g., an n-type dopant or a p-type dopant) as the supporting region 312. The optical modulator structure 202 may further include a supporting region 314 that is physically coupled and/or electrically coupled with the region 306. The supporting region 314 may include the second dopant type such that the region 306 includes the same dopant type (e.g., an n-type dopant or a p-type dopant) as the supporting region 314.

The optical modulator structure 202 may further include a contact region 316 that is physically coupled and/or electrically coupled with the supporting region 312. The contact region 316 may include the first dopant type such that the regions 304*a*, 304*b*, 308, 310*a*, and 310*b* include the same dopant type (e.g., an n-type dopant or a p-type dopant) as the supporting region 312 and the contact region 316. The optical modulator structure 202 may further include a contact region 318 that is physically coupled and/or electrically coupled with the supporting region 314. The contact region 318 may include the second dopant type such that the region 306 includes the same dopant type (e.g., an n-type dopant or a p-type dopant) as the supporting region 314 and the contact region 318. The dopant concentrations in the regions 304*a*, 304*b*, 308, 310*a*, and 310*b*, the supporting region 312, and the contact region 316 may be configured to facilitate and/or promote the flow of charge carriers (e.g., electrons, holes) from the contact region 316 to the regions 304*a*, 304*b*, 308, 310*a*, and 310*b* through the supporting region 312. The different dopant concentrations result in a dopant gradient that facilitates the flow of charge carriers. Similarly, the dopant concentrations in the region 306, the supporting region 314, and contact region 318 may be configured to facilitate and/or promote the flow of charge carriers (e.g., electrons, holes) from the region 306 to the contact region 318 through the supporting region 314. The different dopant concentrations result in a dopant gradient that facilitates the flow of charge carriers.

As further shown in FIG. 3A, a buffer region 320 may provide the dopant gradient between the contact region 316 and the supporting region 312. Similarly, a buffer region 322 may provide the dopant gradient between the contact region 318 and the supporting region 314. For example, by using techniques as described in connection with FIGS. 5A-5J, the buffer region 322 is formed to provide greater control over the flow of charge carriers from the supporting region 314 to the contact region 318.

The contact regions 208 and 210 (as described in connection with FIGS. 2A and 2B) may correspond to the contact regions 316 and 318, respectively. Similarly, the connection regions 212 and 214 (as described in connection with FIGS. 2A and 2B) may correspond to the supporting regions 312 and 314, respectively. Finally, the P-N junction diode 216 (as described in connection with FIGS. 2A and 2B) may correspond to the regions 304*a*, 304*b*, 306, 308, 310*a*, and 310*b*.

Figure 3B:
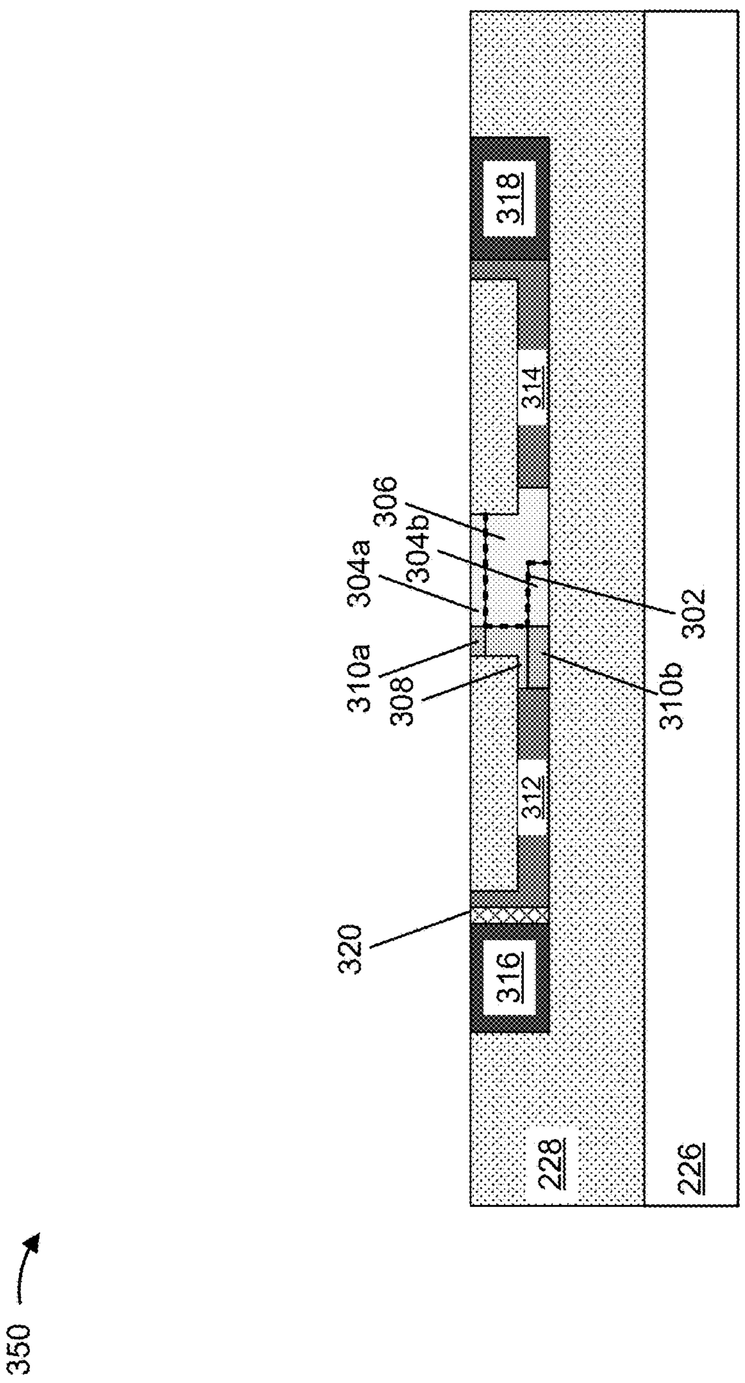

FIG. 3B is a diagram of an example implementation 350 of an optical modulator structure 202 described herein. The optical modulator structure 202 may be included in a semiconductor photonics circuit of a semiconductor photonics device, such as the semiconductor device 200 of FIG. 2A or a semiconductor device 250 of FIG. 2B, among other examples.

The example implementation 350 is similar to the example implementation 300. In the example implementation 350, the region 304*a* extends along the full top surface of the region 306 and thus does not contact the region 306 along an approximately vertical segment. For example, by using techniques as described in connection with FIGS. 4A-4M, the region 304*a* is formed before the region 306 such that the region 304*a* extends along the full top surface of the region 306. As a result, the segment between the region 304*a* and the region 306 may be longer than the segment between the region 304*b* and the region 306.

Additionally, as shown in FIG. 3B, the buffer region 322 is absent. For example, by using techniques as described in connection with FIGS. 4A-4M, the supporting region 314 is formed using a single implantation operation, rather than two implantation operations, and thus does not have the buffer region 322 between the supporting region 314 and the contact region 318.

As indicated above, FIGS. 3A and 3B are provided as examples. Other examples may differ from what is described with regard to FIGS. 3A and 3B.

FIGS. 4A-4M are diagrams of an example implementation 400 of forming a semiconductor device (or a portion thereof) described herein. In particular, the example implementation 400 may include an example of forming an optical modulator structure 202 in a semiconductor device 200 and/or a semiconductor device 250, among other examples. In some implementations, one or more of the semiconductor processing operations described in connection with the example implementation 400 may be performed by one or more of the semiconductor processing tools 102-116 and/or by the wafer/die transport tool 118. In some implementations, one or more of the semiconductor processing operations described in connection with the example implementation 400 may be performed by another semiconductor processing tool.

Figure 4A:
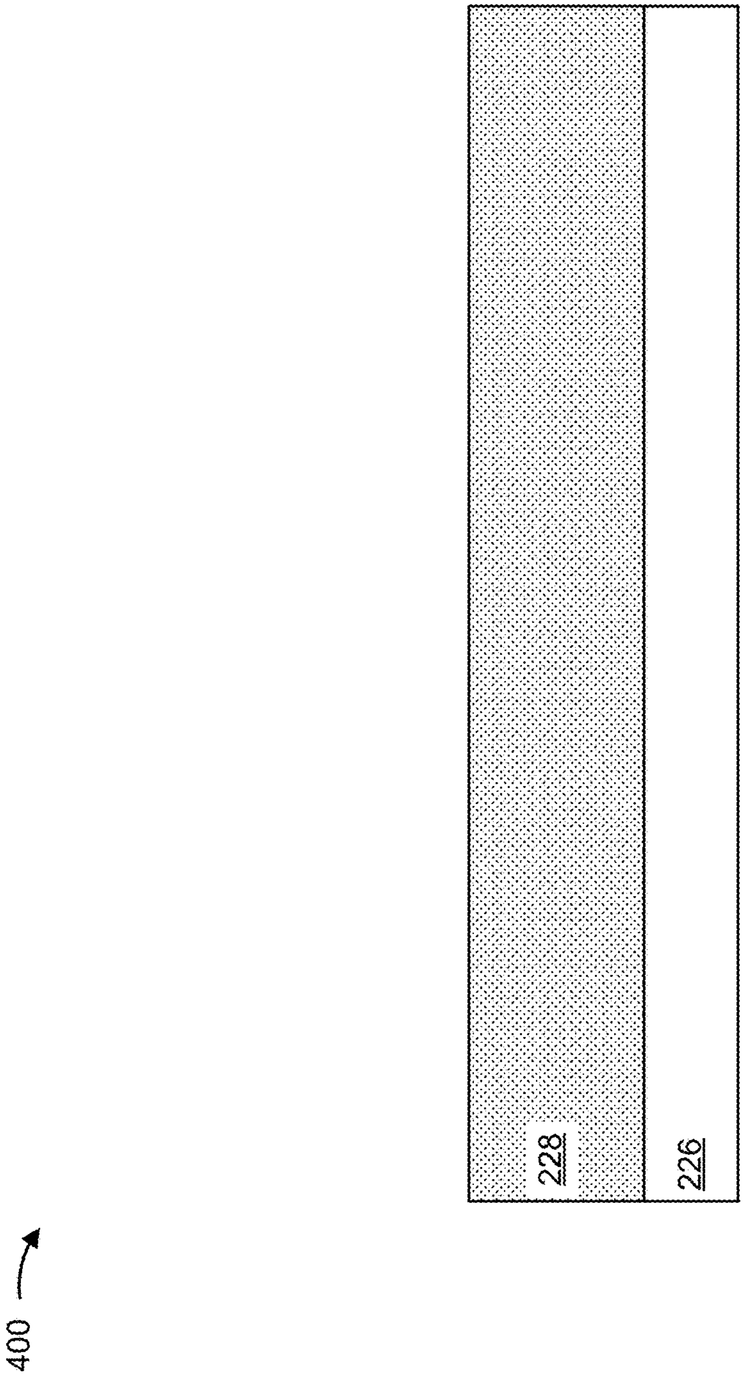
FIGS. 4A-4M are diagrams of an example implementation described herein.

As shown in FIG. 4A, a substrate 226 may be provided (e.g., as a semiconductor wafer). A deposition tool 102 may form a dielectric region 228 over and/or on the substrate 226 (e.g., using a CVD technique, a PVD technique, an oxidation technique, and/or another type of deposition technique). Alternatively, the substrate 226 and the dielectric region 228 may be provided as a part of a silicon on insulator (SOI) substrate. For example, the dielectric region 228 may be a buried oxide or bottom oxide (BOX) layer and/or another type of insulator layer over and/or on the substrate 226.

Figure 4B:
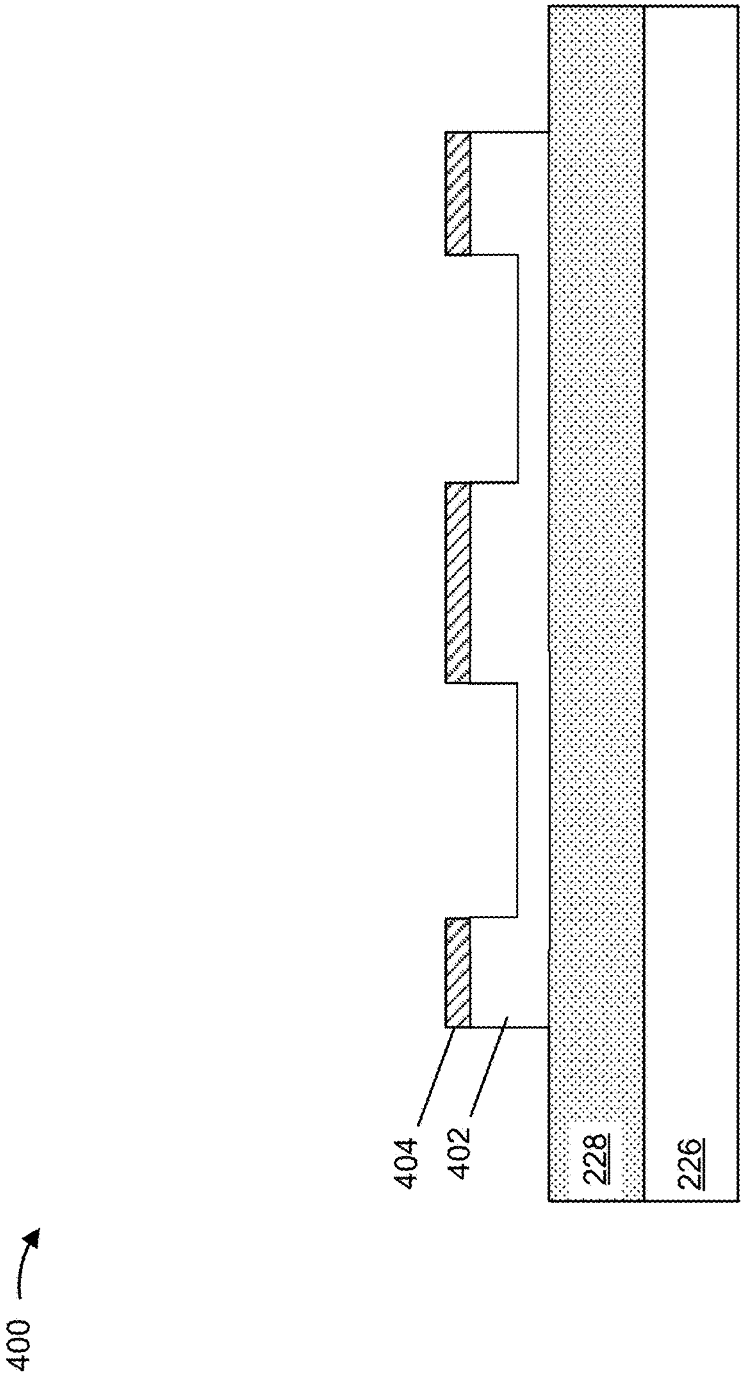

As shown in FIG. 4B, a semiconductor layer 402 (e.g., a silicon (Si) layer and/or another type of semiconductor layer) may be formed over and/or on the dielectric region 228. For example, a deposition tool 102 may form the semiconductor layer 402 (e.g., using a CVD technique, a PVD technique, an epitaxy technique, and/or another type of deposition technique). Alternatively, the semiconductor layer 402 may be provided as a part of an SOI substrate (e.g., as described above).

As further shown in FIG. 4B, a hard mask layer 404 may be formed over and/or on the semiconductor layer 402, and a pattern in the hard mask layer 404 may be used to pattern the semiconductor layer 402. A deposition tool 102 may form the hard mask layer 404 on the semiconductor layer 402 (e.g., using a CVD technique, a PVD technique, and/or another type of deposition technique) and may form a photoresist layer on the hard mask layer 404 (e.g., using a spin-coating technique and/or another type of deposition technique). The hard mask layer 404 may include a silicon nitride ($Si_xN_y$, such as $Si_3N_4$) material or another hard mask material.

An exposure tool 104 may expose the photoresist layer to a radiation source to pattern the photoresist layer. A developer tool 106 may develop and remove portions of the photoresist layer to expose the pattern. An etch tool 108 may etch the hard mask layer 404 to transfer the pattern from the photoresist layer to the hard mask layer 404. An etch tool 108 then etches the semiconductor layer 402 based on the pattern in the hard mask layer 404. In some implementations, the semiconductor layer 402 is etched using a plasma etch operation, a wet chemical etch operation, and/or another type of etch operation. In some implementations, a photoresist removal tool 114 removes the remaining portions of the photoresist layer (e.g., using a chemical stripper, plasma ashing, and/or another technique).

Figure 4C:
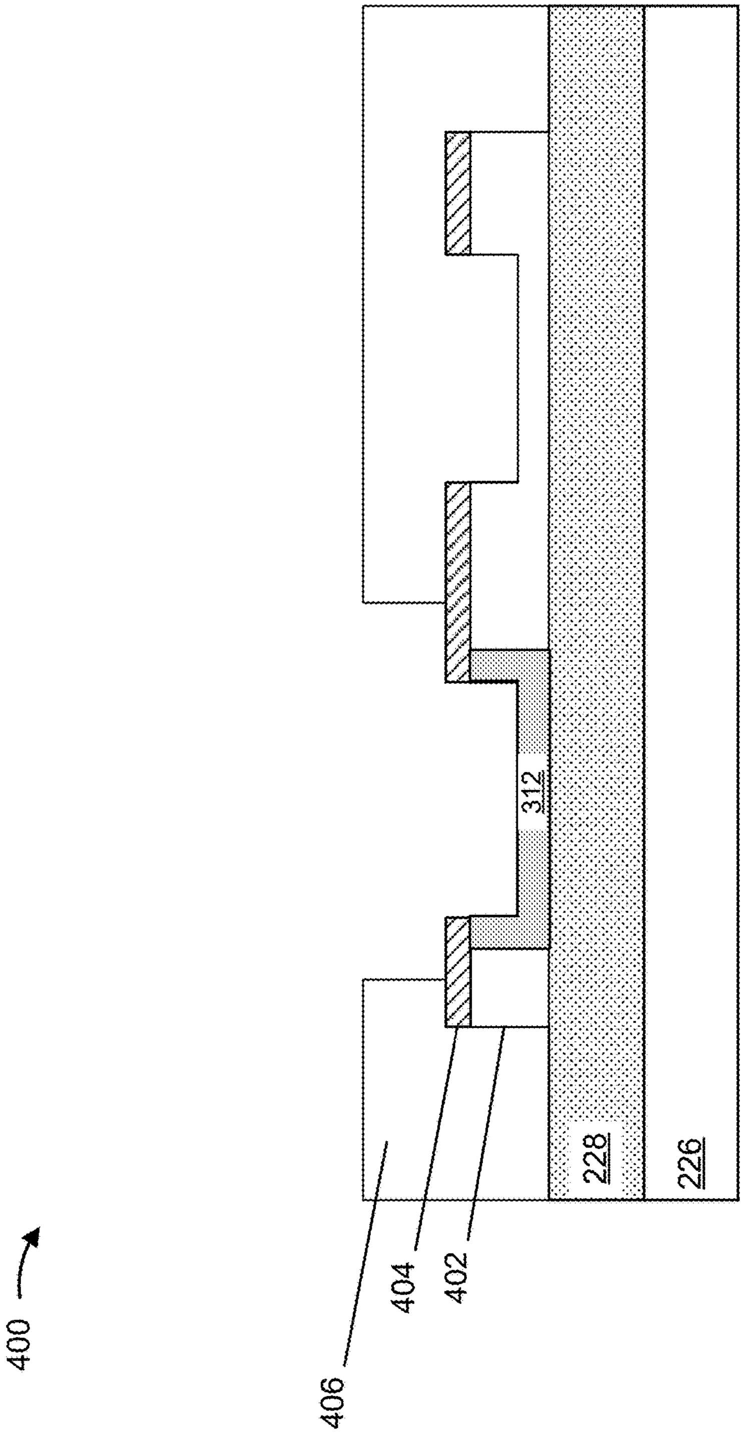

As shown in FIG. 4C, a photoresist layer 406 may be formed over and/or on the dielectric region 228. A deposition tool 102 may form the photoresist layer 406 using a spin-coating technique and/or another type of deposition technique. An exposure tool 104 may expose the photoresist layer 406 to a radiation source, and a developer tool 106 may develop and remove portions of the photoresist layer 406 to pattern the photoresist layer 406 (e.g., as shown in FIG. 4C).

As further shown in FIG. 4C, a portion of the semiconductor layer 402 may be doped with a first dopant type (e.g., one or more dopant materials classified in the first type) to form a doped semiconductor region. For example, an ion implantation tool 116 may perform one or more doping operations or ion implantation operations using a combination of the hard mask layer 404 and the photoresist layer 406 as an implantation mask. Accordingly, a supporting region 312 may be formed.

In some implementations, the first dopant type includes an n-type dopant such as phosphorous (P). In these implementations, an implantation energy that is included in a range of approximately 80 kiloelectronvolts (keV) to approximately 130 keV is used to implant phosphorous ions into the semiconductor layer 402, and a dosage of the phosphorous ions that is used may be included in a range of approximately $1\times10^{14}$ ions per cubic centimeter (ions/$cm^3$) to approximately $6\times10^{14}$ ions/$cm^3$. However, other values for these ranges are within the scope of the present disclosure.

Additionally, or alternatively, the first dopant type may include arsenic (As). In these implementations, an implantation energy that is included in a range of approximately 40 keV to approximately 60 keV is used to implant arsenic ions into the semiconductor layer 402, and a dosage of the arsenic ions that is used may be included in a range of approximately $5\times10^{13}$ ions/$cm^3$ to approximately $5\times10^{14}$ ions/$cm^3$. However, other values for these ranges are within the scope of the present disclosure.

In some implementations, an ion implantation tool 116 bombards a surface of the semiconductor layer 402 at one or more angles to implant ions in exposed sidewalls of the semiconductor layer 402. Here, the implantation of ions in the sidewalls is self-aligned with the hard mask layer 404, meaning that the hard mask layer 404 functions as an implantation barrier. Ions may be implanted in the sidewalls at a tilt angle that is included in a range of approximately 45 degrees to approximately-45 degrees. However, other values for the range are within the scope of the present disclosure. The tilt angle may refer to an angle of bombardment relative to an approximately perpendicular angle to the substrate 226.

Figure 4D:
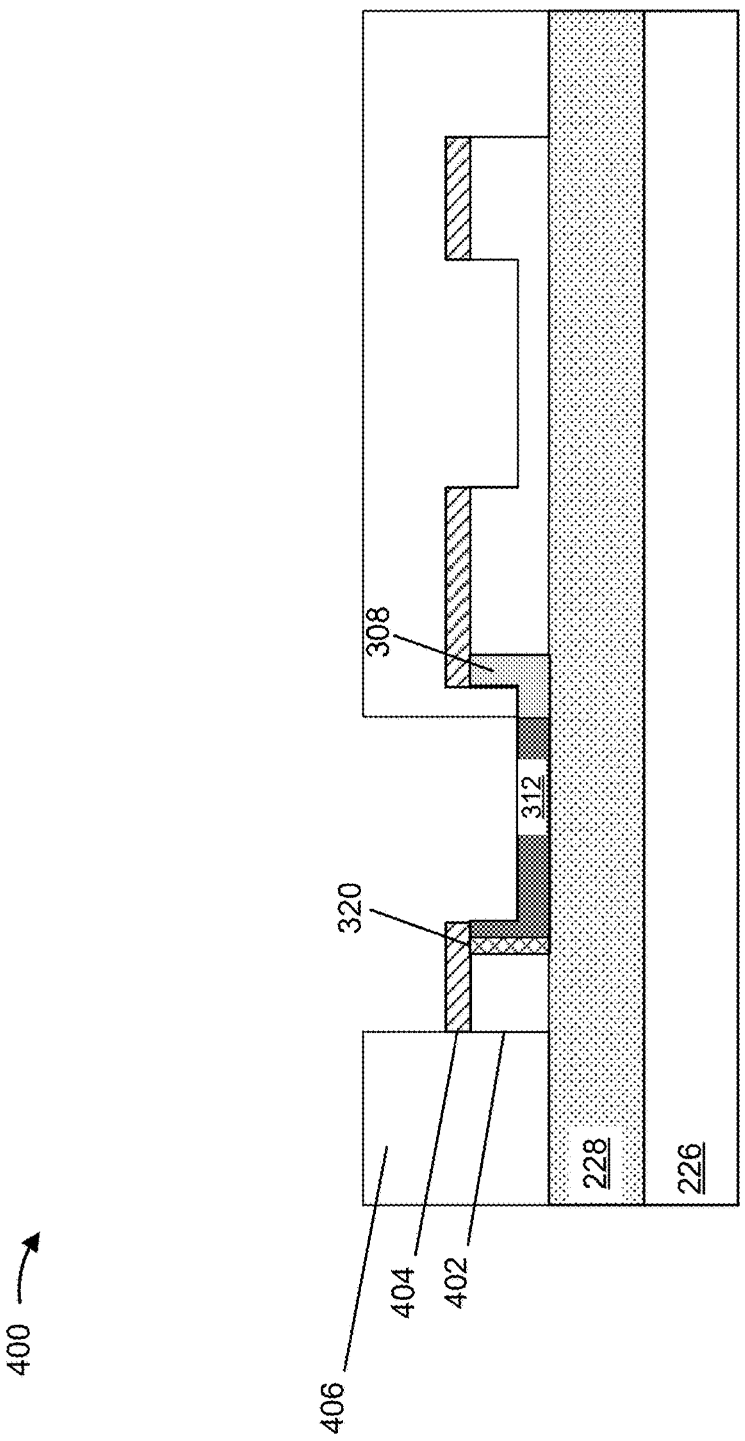

As shown in FIG. 4D, a carrier concentration may be increased in the supporting region 312. For example, an ion implantation tool 116 may implant additional n-type dopant material, such as phosphorous (P). In some implementations, an implantation energy that is included in a range of approximately 10 keV to approximately 30 keV is used to implant additional phosphorous ions into the semiconductor layer 402, and a dosage of the phosphorous ions that is used may be included in a range of approximately $1\times10^{14}$ ions/$cm^3$ to approximately $3\times10^{15}$ ions/$cm^3$. However, other values for these ranges are within the scope of the present disclosure. Additionally, the phosphorous ions may be implanted at a tilt angle that is included in a range of approximately 0 degrees to approximately 30 degrees. However, other values for the range are within the scope of the present disclosure.

As further shown in FIG. 4D, increasing the carrier concentration at the supporting region 312 results in a buffer region 320 (with a smaller doping concentration than the supporting region 312). Additionally, increasing the carrier concentration at the supporting region 312 results in a region 308 (with a smaller doping concentration than the supporting region 312).

The same mask (that is, the same photoresist layer 406) may be used to increase the carrier concentration as was used to form the supporting region 312. Alternatively, the photoresist layer 406 may be re-patterned (e.g., to protect the region 308) before the carrier concentration is increased. A photoresist removal tool 114 may subsequently remove the remaining portions of the photoresist layer 406 (e.g., using a chemical stripper, plasma ashing, and/or another technique) after the carrier concentration is increased.

Figure 4E:
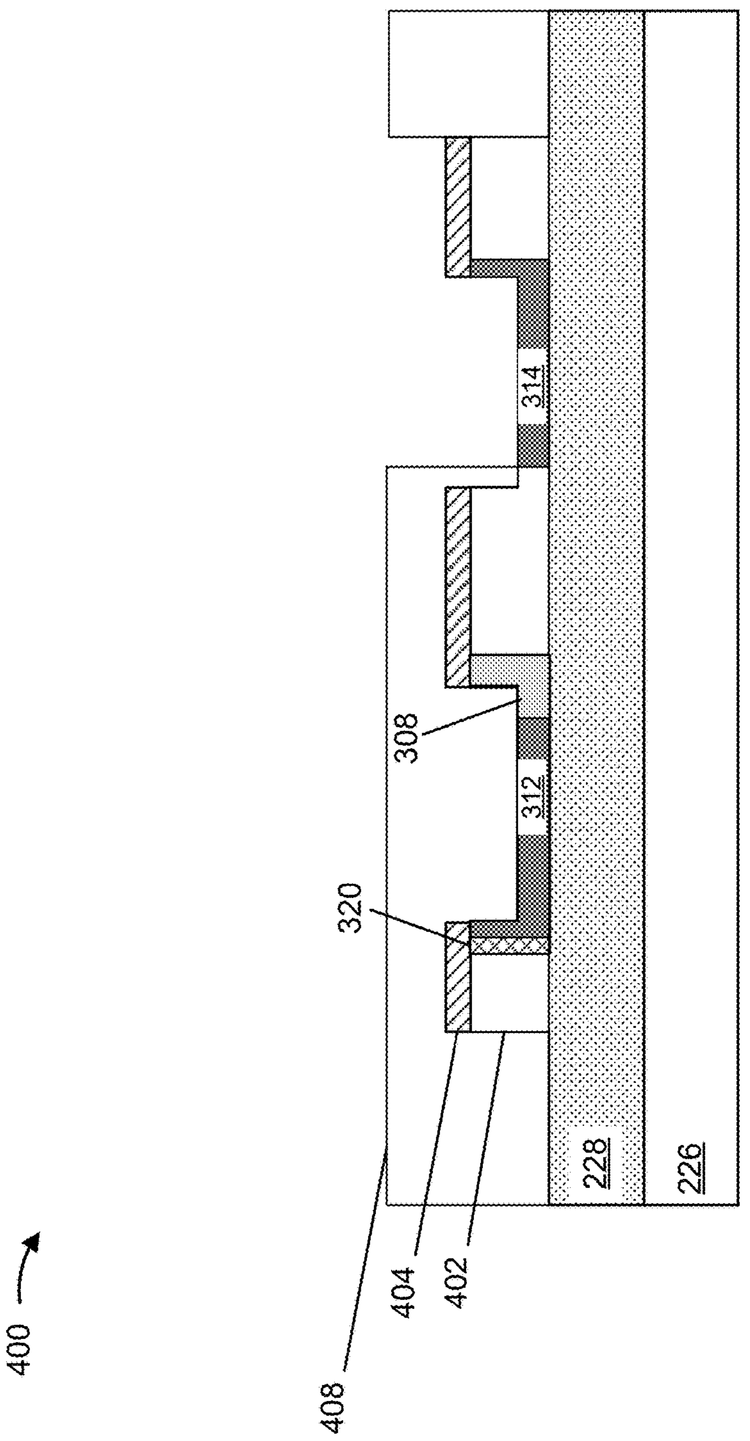

As shown in FIG. 4E, another photoresist layer 408 may be formed over and/or on the dielectric region 228. A deposition tool 102 may form the photoresist layer 408 using a spin-coating technique and/or another type of deposition technique. An exposure tool 104 may expose the photoresist layer 408 to a radiation source, and a developer tool 106 may develop and remove portions of the photoresist layer 408 to pattern the photoresist layer 408 (e.g., as shown in FIG. 4E). The supporting region 312 may be covered by the photoresist layer 408 such that a second dopant type may be implanted into another region of the semiconductor layer 402.

As further shown in FIG. 4E, a portion of the semiconductor layer 402 may be doped with the second dopant type (e.g., one or more dopant materials classified in the second type) to form a doped semiconductor region. For example, an ion implantation tool 116 may perform one or more doping operations or ion implantation operations using a combination of the hard mask layer 404 and the photoresist layer 408 as an implantation mask. Accordingly, a supporting region 314 may be formed.

In some implementations, the second dopant type includes a p-type dopant such as boron (B). In these implementations, an implantation energy that is included in a range of approximately 10 keV to approximately 30 keV is used to implant boron ions into the semiconductor layer 402, and a dosage of the boron ions that is used may be included in a range of approximately $1\times10^{14}$ ions/$cm^3$ to approximately $3\times10^{15}$ ions/$cm^3$. However, other values for these ranges are within the scope of the present disclosure. Additionally, the boron ions may be implanted at a tilt angle that is included in a range of approximately 0 degrees to approximately 30 degrees. However, other values for the range are within the scope of the present disclosure.

A photoresist removal tool may subsequently remove the remaining portions of the photoresist layer 408 (e.g., using a chemical stripper, plasma ashing, and/or another technique) after the supporting region 314 is formed. By using a single implantation operation to form the supporting region 314, power, processing resources, and raw materials are conserved. Additionally, a manufacturing time for forming the optical modulator structure 202 is reduced.

Figure 4F:
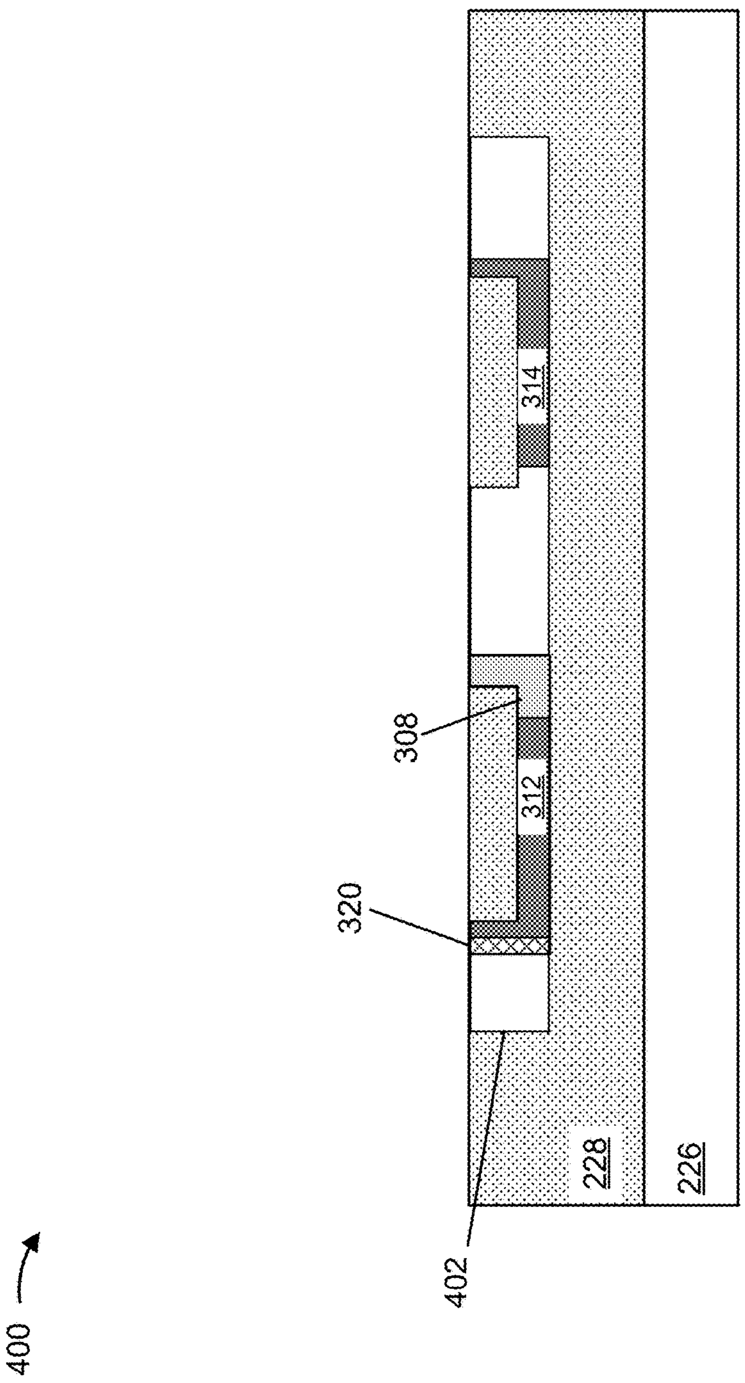

As shown in FIG. 4F, additional material for the dielectric region 228 may be deposited. For example, a deposition tool 102 may deposit the additional material for the dielectric region 228 using a CVD technique, a PVD technique, an oxidation technique (e.g., a thermal oxidation technique), and/or another type of deposition technique. In some implementations, an STI liner oxidation operation and/or a high density plasma (HDP) deposition operation may be used to deposit the additional material of the dielectric region 228. In some implementations, a planarization tool 110 may perform a CMP operation and/or another type of planarization operation to planarize the dielectric region 228 after the additional material of the dielectric region 228 is deposited. The CMP operation may additionally remove the hard mask layer 404. Additionally and/or alternatively, an etch tool 108 may remove the hard mask layer 404 (e.g., using dry etching and/or wet/chemical etching).

Figure 4G:
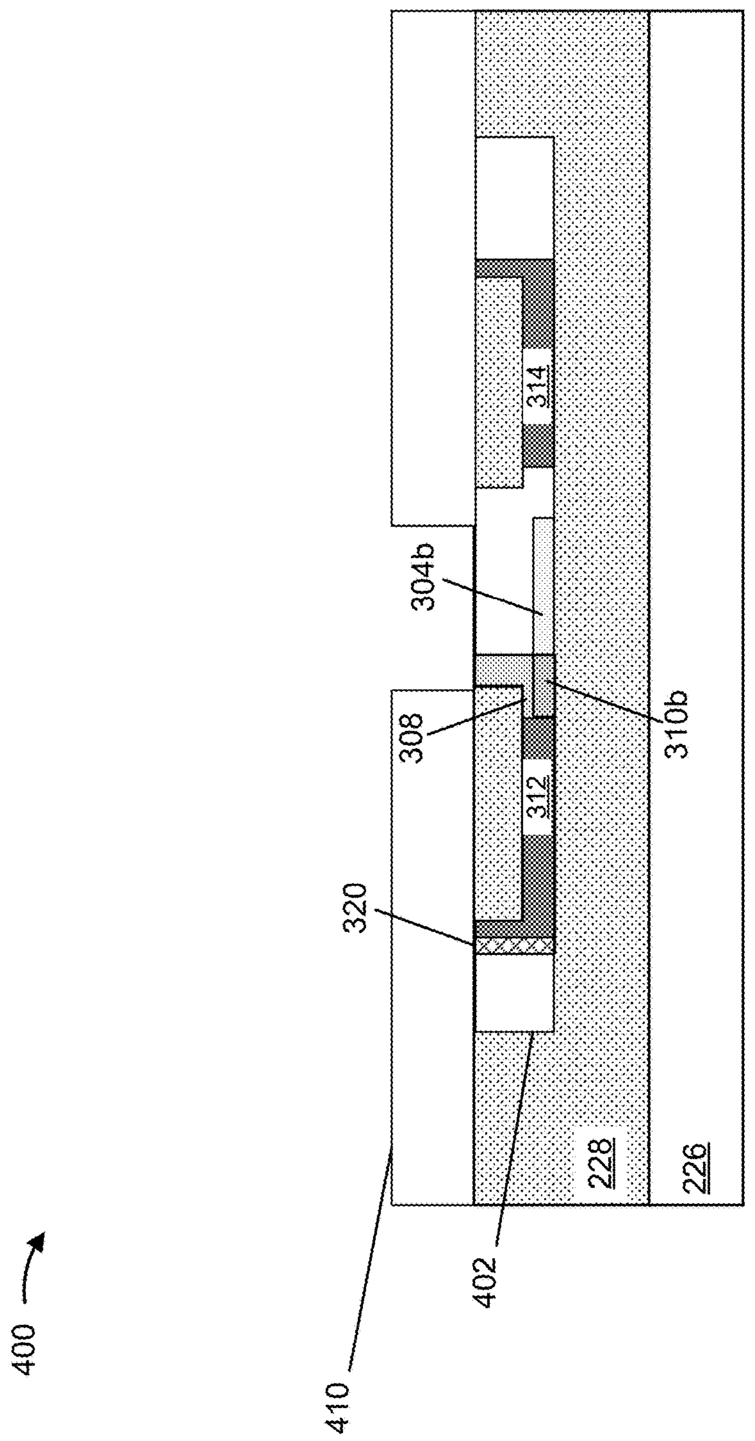

As shown in FIG. 4G, another photoresist layer 410 may be formed over and/or on the dielectric region 228. A deposition tool 102 may form the photoresist layer 410 using a spin-coating technique and/or another type of deposition technique. An exposure tool 104 may expose the photoresist layer 410 to a radiation source, and a developer tool 106 may develop and remove portions of the photoresist layer 410 to pattern the photoresist layer 410 (e.g., as shown in FIG. 4G). A portion of the semiconductor layer 402 that will be formed into a P-N junction diode may be exposed through the pattern of the photoresist layer 410.

As further shown in FIG. 4G, a portion of the semiconductor layer 402 may be doped with the first dopant type (e.g., one or more dopant materials classified in the first type) to form a doped semiconductor region. For example, an ion implantation tool 116 may perform one or more doping operations or ion implantation operations using the photoresist layer 410 as an implantation mask. Accordingly, a region 304*b* may be formed. As further shown in FIG. 4G, ion implantation to form the region 304*b* results in a region 310*b* (with a larger doping concentration than the region 308).

In some implementations, the first dopant type includes an n-type dopant such as phosphorous (P). In these implementations, an implantation energy that is included in a range of approximately 140 keV to approximately 180 keV is used to implant phosphorous ions into the semiconductor layer 402, and a dosage of the phosphorous ions that is used may be included in a range of approximately $5\times10^{13}$ ions/cm$^3$ to approximately $5\times10^{14}$ ions/cm$^3$. However, other values for these ranges are within the scope of the present disclosure.

Figure 4H:
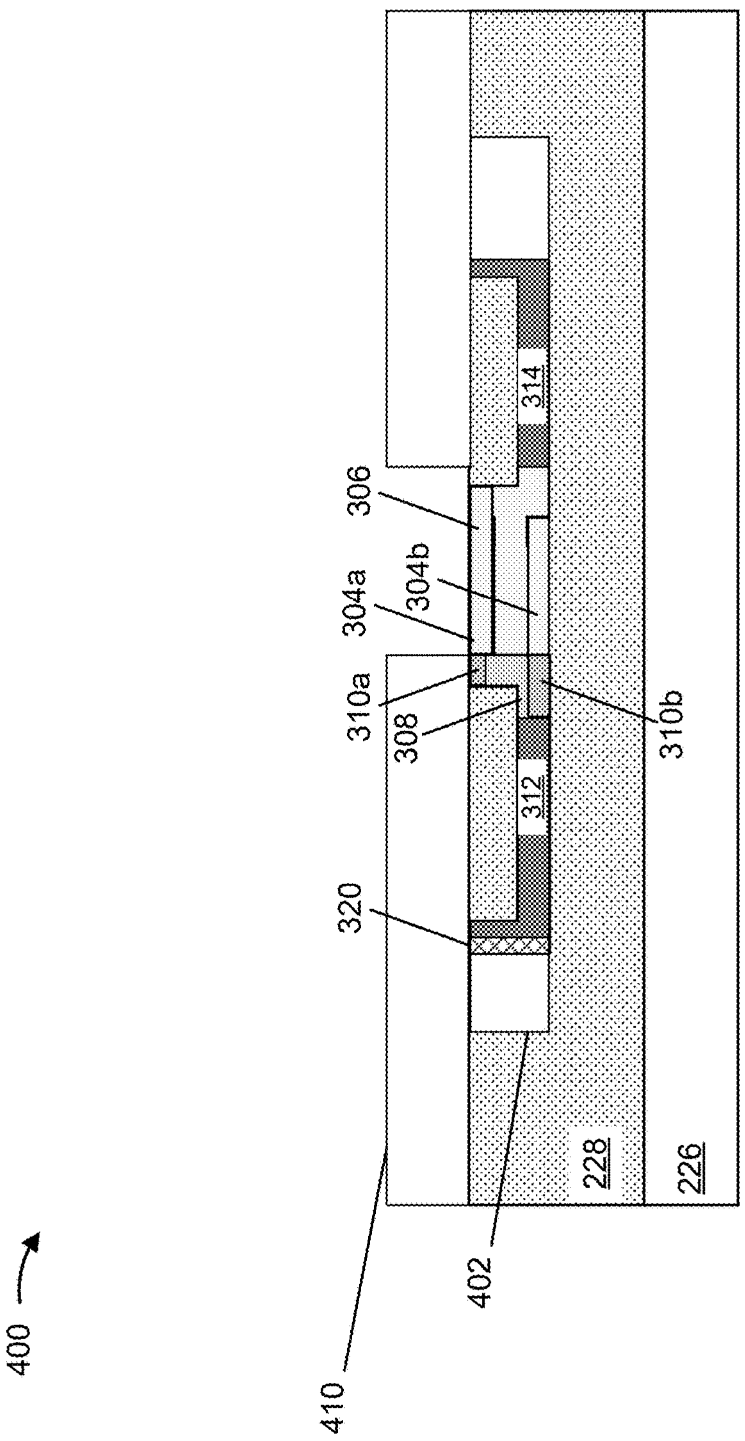

As shown in FIG. 4H, additional doping operations may be formed. In a first implantation operation, an ion implantation tool 116 may implant additional n-type dopant material, such as phosphorous (P). In some implementations, an implantation energy that is included in a range of approximately 25 keV to approximately 50 keV is used to implant additional phosphorous ions into the semiconductor layer 402, and a dosage of the phosphorous ions that is used may be included in a range of approximately $5\times10^{13}$ ions/cm$^3$ to approximately $5\times10^{14}$ ions/cm$^3$. However, other values for these ranges are within the scope of the present disclosure. Accordingly, a region 304*a* may be formed. As further shown in FIG. 4H, ion implantation to form the region 304*a* results in a region 310*a* (with a larger doping concentration than the region 308 caused by migration of ions from the region 304*a* into the region 310*a*).

In a second implantation operation, an ion implantation tool 116 may implant p-type dopant material, such as boron (B). In some implementations, an implantation energy that is included in a range of approximately 30 keV to approximately 50 keV is used to implant boron ions into the semiconductor layer 402. Using a larger implantation energy than used for the n-type dopant forming the region 304*a* enables formation of a P-N junction at a bottom surface of the region 304*a*. A dosage of the boron ions that is used may be included in a range of approximately $5\times10^{13}$ ions/cm$^3$ to approximately $5\times10^{14}$ ions/cm$^3$. However, other values for these ranges are within the scope of the present disclosure. Accordingly, a region 306, which interfaces with the region 304*a*, may be formed.

In a third implantation operation, an ion implantation tool 116 may implant additional p-type dopant material, such as boron (B). In some implementations, an implantation energy that is included in a range of approximately 50 keV to approximately 70 keV is used to implant additional boron ions into the semiconductor layer 402. Using a larger implantation energy than used in the second implantation operation enables formation of a P-N junction at a top surface of the region 304*b*. A dosage of the boron ions that is used may be included in a range of approximately $5\times10^{13}$ ions/cm$^3$ to approximately $5\times10^{14}$ ions/cm$^3$. However, other values for these ranges are within the scope of the present disclosure. Accordingly, the region 306 may be expanded to interface with the region 304*b*.

The same mask (that is, the same photoresist layer 410) may be used to form the regions 304*a* and 306 as was used to form the regions 304*b* and 310*b*. Alternatively, the photoresist layer 410 may be re-patterned (e.g., to protect the region 308). A photoresist removal tool 114 may subsequently remove the remaining portions of the photoresist layer 410 (e.g., using a chemical stripper, plasma ashing, and/or another technique) after the carrier concentration is increased.

Figure 4I:
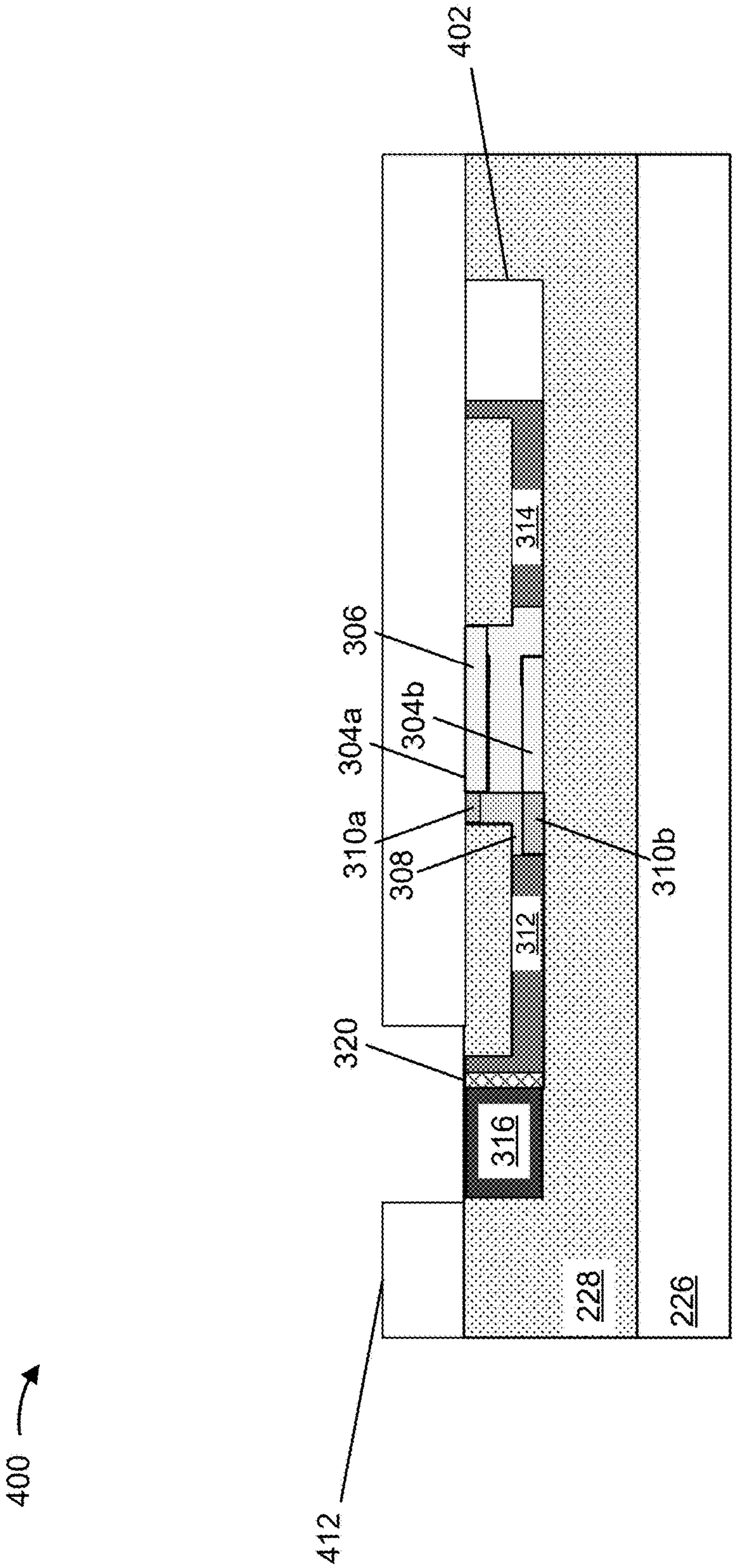

As shown in FIG. 4I, another photoresist layer 412 may be formed over and/or on the dielectric region 228. A deposition tool 102 may form the photoresist layer 412 using a spin-coating technique and/or another type of deposition technique. An exposure tool 104 may expose the photoresist layer 412 to a radiation source, and a developer tool 106 may develop and remove portions of the photoresist layer 412 to pattern the photoresist layer 412 (e.g., as shown in FIG. 4I). A portion of the semiconductor layer 402 that will be formed into a contact region may be exposed through the pattern of the photoresist layer 412.

As further shown in FIG. 4I, a portion of the semiconductor layer 402 may be doped with the first dopant type (e.g., one or more dopant materials classified in the first type) to form a doped semiconductor region. For example, an ion implantation tool 116 may perform one or more doping operations or ion implantation operations using the photoresist layer 412 as an implantation mask. Accordingly, a contact region 316 may be formed.

A photoresist removal tool may subsequently remove the remaining portions of the photoresist layer 412 (e.g., using a chemical stripper, plasma ashing, and/or another technique). In some implementations, a rapid thermal anneal (RTA) operation and/or a furnace thermal activation operation is used to facilitate activation and/or absorption of dopants in the contact region 316.

Figure 4J:
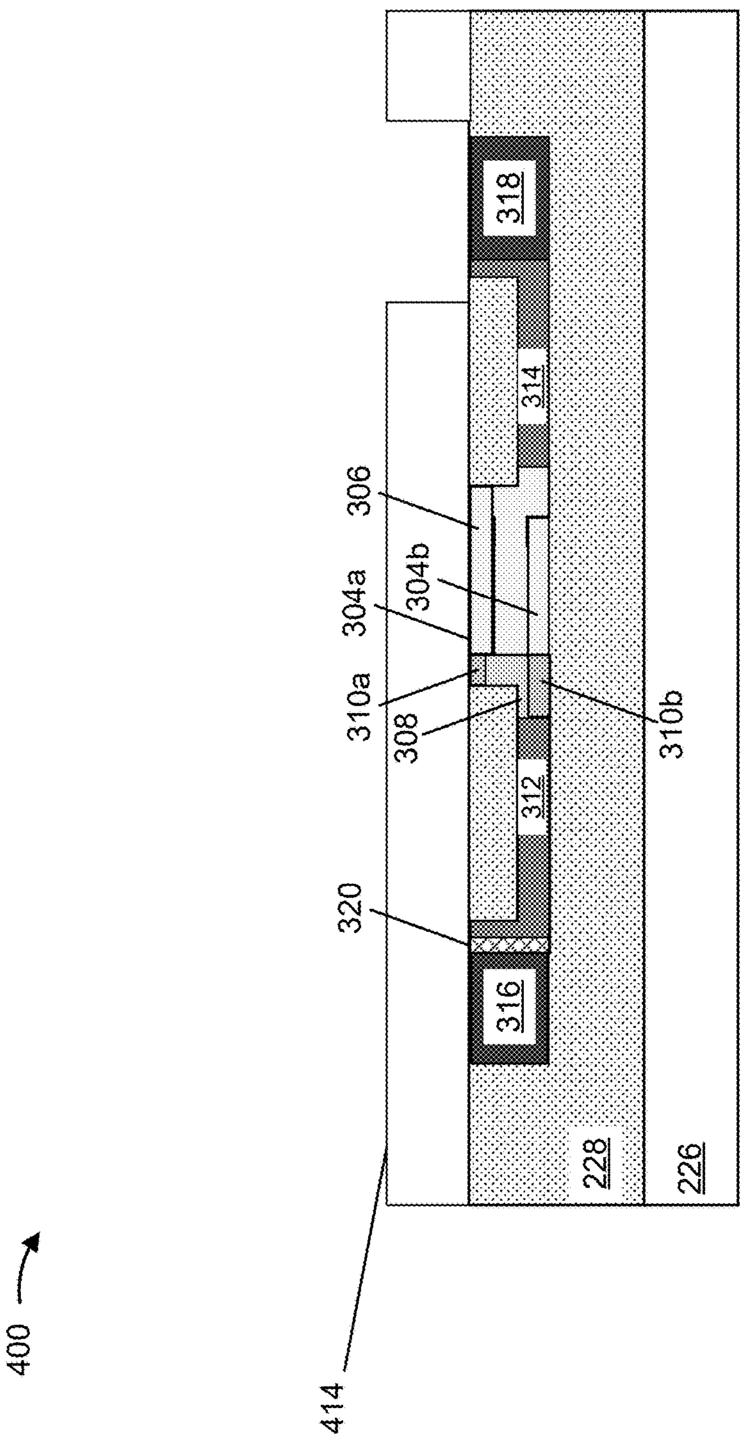

As shown in FIG. 4J, another photoresist layer 414 may be formed over and/or on the dielectric region 228. A deposition tool 102 may form the photoresist layer 414 using a spin-coating technique and/or another type of deposition technique. An exposure tool 104 may expose the photoresist layer 414 to a radiation source, and a developer tool 106 may develop and remove portions of the photoresist layer 414 to pattern the photoresist layer 414 (e.g., as shown in FIG. 4J). A portion of the semiconductor layer 402 that will be formed into a contact region may be exposed through the pattern of the photoresist layer 414.

As further shown in FIG. 4J, a portion of the semiconductor layer 402 may be doped with the second dopant type (e.g., one or more dopant materials classified in the second type) to form a doped semiconductor region. For example, an ion implantation tool 116 may perform one or more doping operations or ion implantation operations using the photoresist layer 414 as an implantation mask. Accordingly, a contact region 318 may be formed.

A photoresist removal tool may subsequently remove the remaining portions of the photoresist layer 414 (e.g., using a chemical stripper, plasma ashing, and/or another technique). In some implementations, an RTA operation and/or a furnace thermal activation operation is used to facilitate activation and/or absorption of dopants in the contact region 318.

Figure 4K:
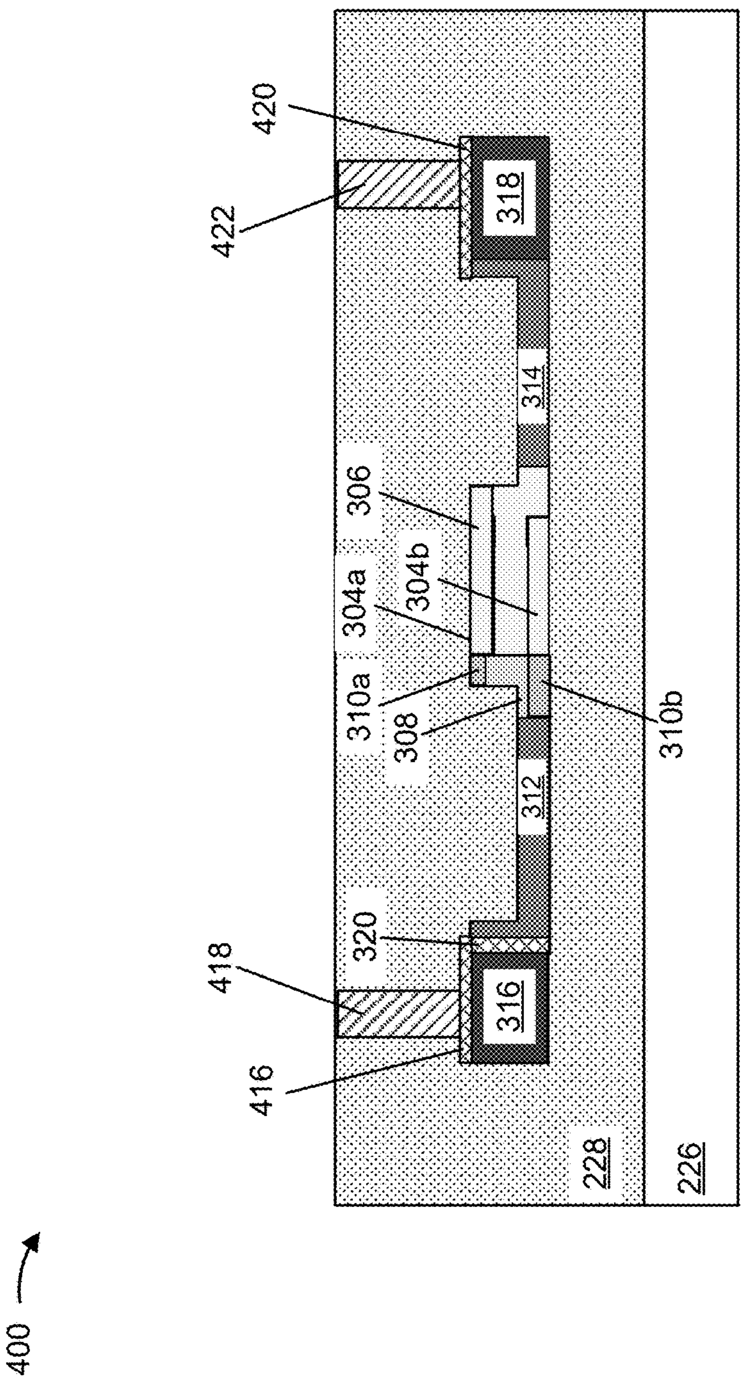

As shown in FIG. 4K, a silicide layer 416 may be formed over and/or on the top surface of the contact region 316, and a silicide layer 420 may be formed over and/or on the top surface of the contact region 318. The silicide layers 416 and 420 may each include a metal silicide layer. A deposition tool 102 may deposit the silicide layers 416 and 420 using a CVD technique, a PVD technique, an ALD technique, a silicidation technique, and/or another deposition technique. In some implementations, a deposition tool 102 may perform a pre-clean operation to remove oxides (e.g., native oxides) from a top surface of the contact region 316 and from a top surface of the contact region 318 prior to formation of the silicide layers 416 and 420.

As further shown in FIG. 4K, additional material for the dielectric region 228 may be deposited. For example, a deposition tool 102 may deposit the additional material for the dielectric region 228 using a CVD technique, a PVD technique, an oxidation technique (e.g., a thermal oxidation technique), and/or another type of deposition technique. In some implementations, a planarization tool 110 may perform a CMP operation and/or another type of planarization operation to planarize the dielectric region 228 after the additional material of the dielectric region 228 is deposited.

As shown in FIG. 4K, a contact structure 418 and a contact structure 422 may be formed in the dielectric region 228. The contact structure 418 may be formed over the contact region 316 and landing on the silicide layer 416. The contact structure 422 may be formed over the contact region 318 and landing on the silicide layer 420. The contact structures 418 and 422 may be formed in recesses that are respectively formed over the contact regions 316 and 318. In some implementations, a pattern in a photoresist layer is used to etch the dielectric region 228 to form the recesses. In these implementations, a deposition tool 102 forms the photoresist layer on the dielectric region 228, an exposure tool 104 exposes the photoresist layer to a radiation source to pattern the photoresist layer, a developer tool 106 develops and removes portions of the photoresist layer to expose the pattern, and an etch tool 108 etches the dielectric region 228 based on the pattern to form the recesses. The dielectric region 228 may be etched using a plasma etch operation, a wet chemical etch operation, and/or another type of etch operation. In some implementations, a photoresist removal tool 114 removes the remaining portions of the photoresist layer (e.g., using a chemical stripper, plasma ashing, and/or another technique) after formation of the recesses. A hard mask layer may be used as an alternative for etching the dielectric region 228.

A deposition tool 102 and/or a plating tool 112 may deposit the contact structures 418 and 422 in the recesses (e.g., using a CVD technique, a PVD technique, an ALD technique, an electroplating technique, and/or another type of deposition technique).

Figure 4L:
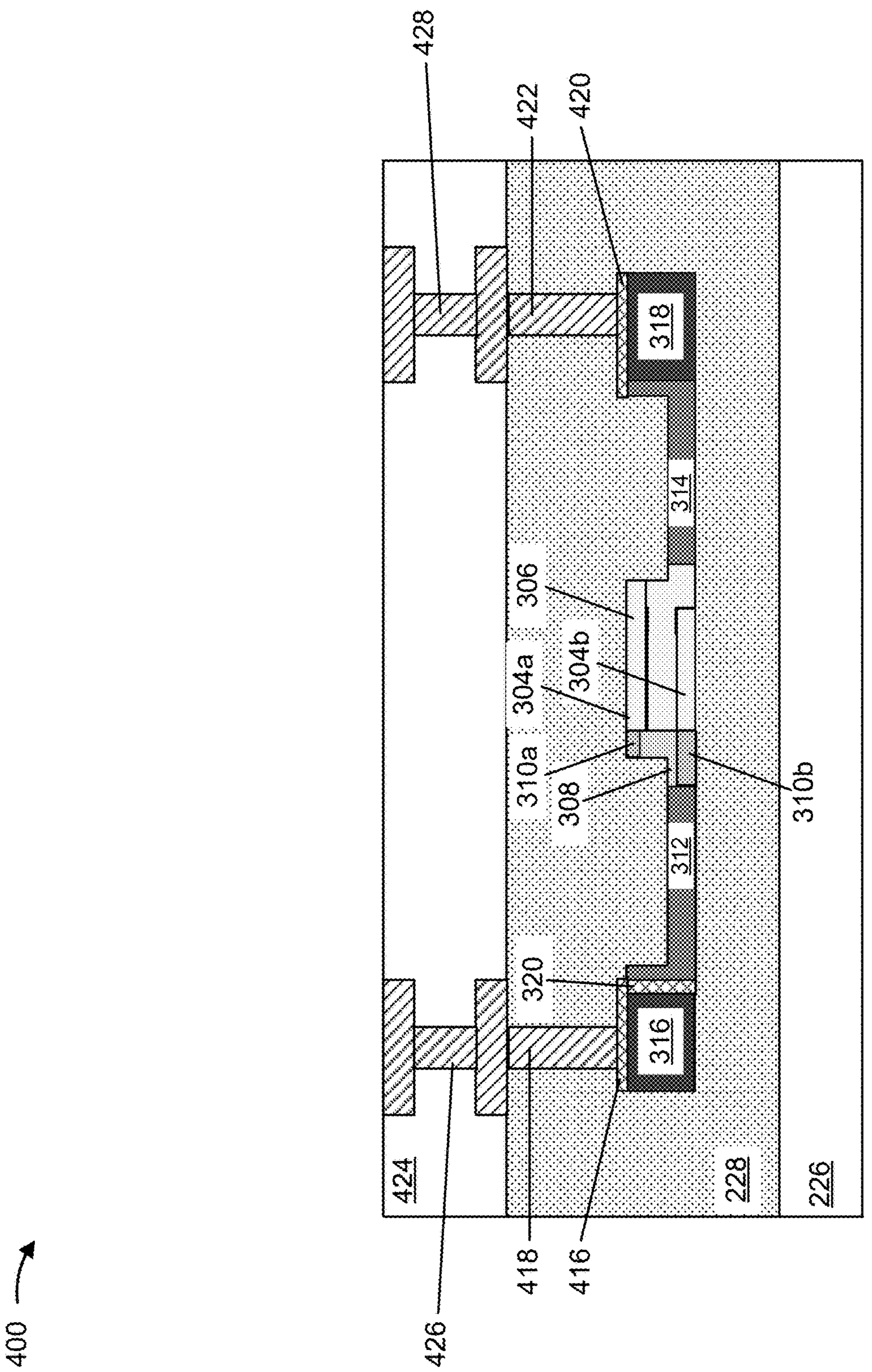

As shown in FIG. 4L, a dielectric region 424 may be formed over and/or on the dielectric region 228. For example, a deposition tool 102 may deposit the dielectric region 424 using a CVD technique, a PVD technique, an oxidation technique (e.g., a thermal oxidation technique), and/or another type of deposition technique.

As further shown in FIG. 4L, a metallization layer 426 and a metallization layer 428 may be formed in the dielectric region 424. The metallization layer 426 may be formed over the contact structure 418. The metallization layer 428 may be formed over the contact structure 422. The metallization layers 426 and 428 may each include tungsten (W), cobalt (Co), ruthenium (Ru), titanium (Ti), aluminum (Al), copper (Cu), and/or gold (Au), among other examples of conductive materials. The metallization layers 426 and 428 may include vias, trenches, contact plugs, and/or another type of metallization layers. In some implementations, an etch tool 108 may remove portions of the dielectric region 424 to expose the contact structures 418 and 422. A deposition tool 102 and/or a plating tool 112 may deposit the metallization layers 426 and 428 in a CVD operation, a PVD operation, an ALD operation, an electroplating technique, and/or another type of deposition technique. In some implementations, a seed layer is first deposited, and the metallization layers 426 and 428 are deposited on the seed layer. In some implementations, a planarization tool 110 planarizes the metallization layer 426 and 428.

Figure 4M:
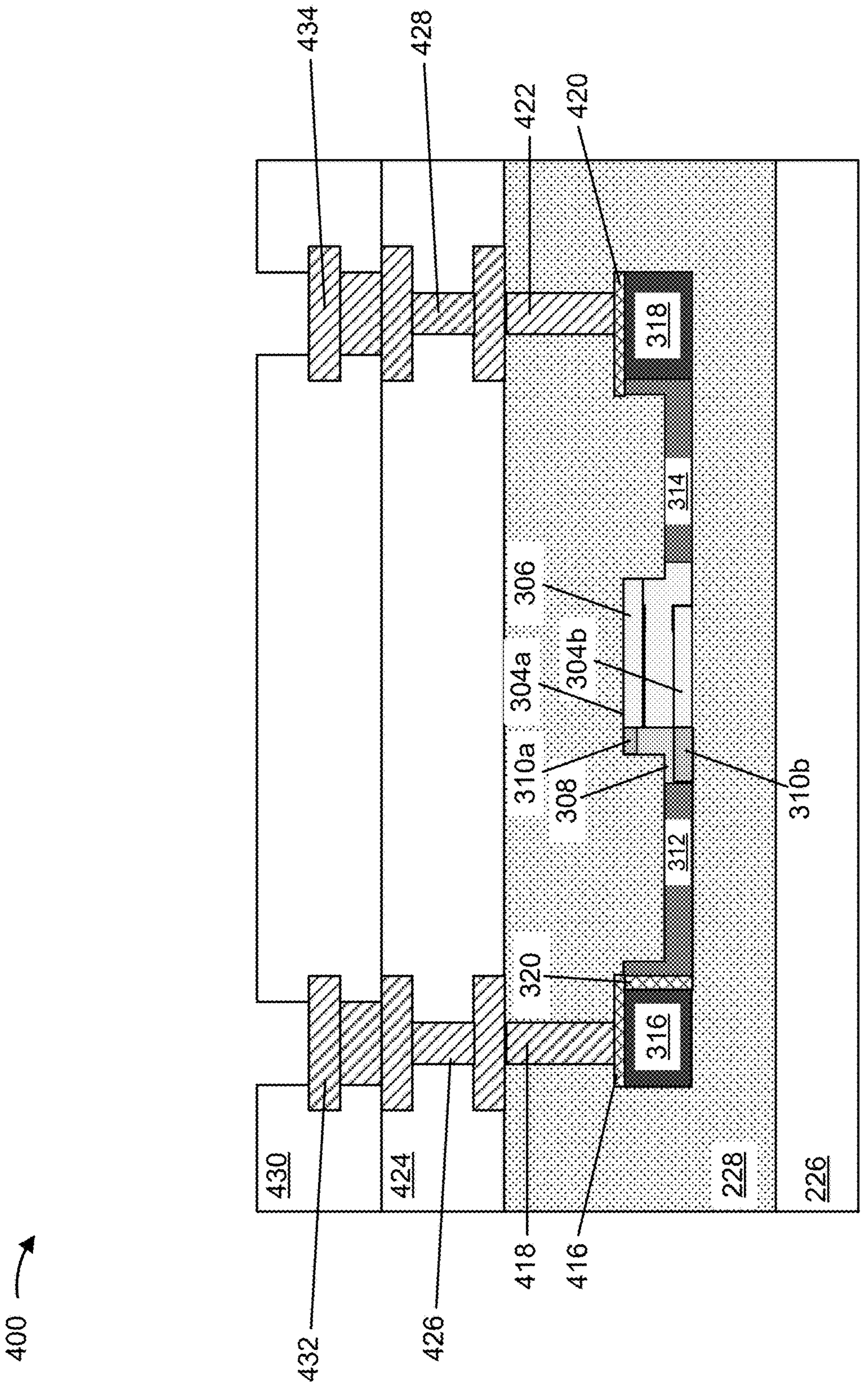

As shown in FIG. 4M, a dielectric region 430 may be formed over and/or on the dielectric region 424. For example, a deposition tool 102 may deposit the dielectric region 430 using a CVD technique, a PVD technique, an oxidation technique (e.g., a thermal oxidation technique), and/or another type of deposition technique.

As further shown in FIG. 4M, a metallization layer 432 and a metallization layer 434 may be formed in the dielectric region 430. The metallization layer 432 may be formed over the metallization layer 426. The metallization layer 434 may be formed over the metallization layer 428. The metallization layers 432 and 434 may each include tungsten (W), cobalt (Co), ruthenium (Ru), titanium (Ti), aluminum (Al), copper (Cu), and/or gold (Au), among other examples of conductive materials. The metallization layers 432 and 434 may include vias, trenches, contact plugs, and/or another type of metallization layers. In some implementations, an etch tool 108 may remove portions of the dielectric region 430 to expose the metallization layers 426 and 428. A deposition tool 102 and/or a plating tool 112 may deposit the metallization layers 432 and 434 in a CVD operation, a PVD operation, an ALD operation, an electroplating technique, and/or another type of deposition technique. In some implementations, a seed layer is first deposited, and the metallization layers 432 and 434 are deposited on the seed layer. In some implementations, a planarization tool 110 planarizes the metallization layer 432 and 434.

Additional dielectric regions and/or additional metallization layers may be formed until a sufficient or target quantity of metallization layers is formed.

As indicated above, FIGS. 4A-4M are provided as an example. Other examples may differ from what is described with regard to FIGS. 4A-4M.

FIGS. 5A-5J are diagrams of an example implementation 500 of forming a semiconductor device (or a portion thereof) described herein. In particular, the example implementation 500 may include an example of forming an optical modulator structure 202 in a semiconductor device 200 and/or a semiconductor device 250, among other examples. In some implementations, one or more of the semiconductor processing operations described in connection with the example implementation 500 may be performed by one or more of the semiconductor processing tools 102-116 and/or by the wafer/die transport tool 118. In some implementations, one or more of the semiconductor processing operations described in connection with the example implementation 500 may be performed by another semiconductor processing tool.

Figure 5A:
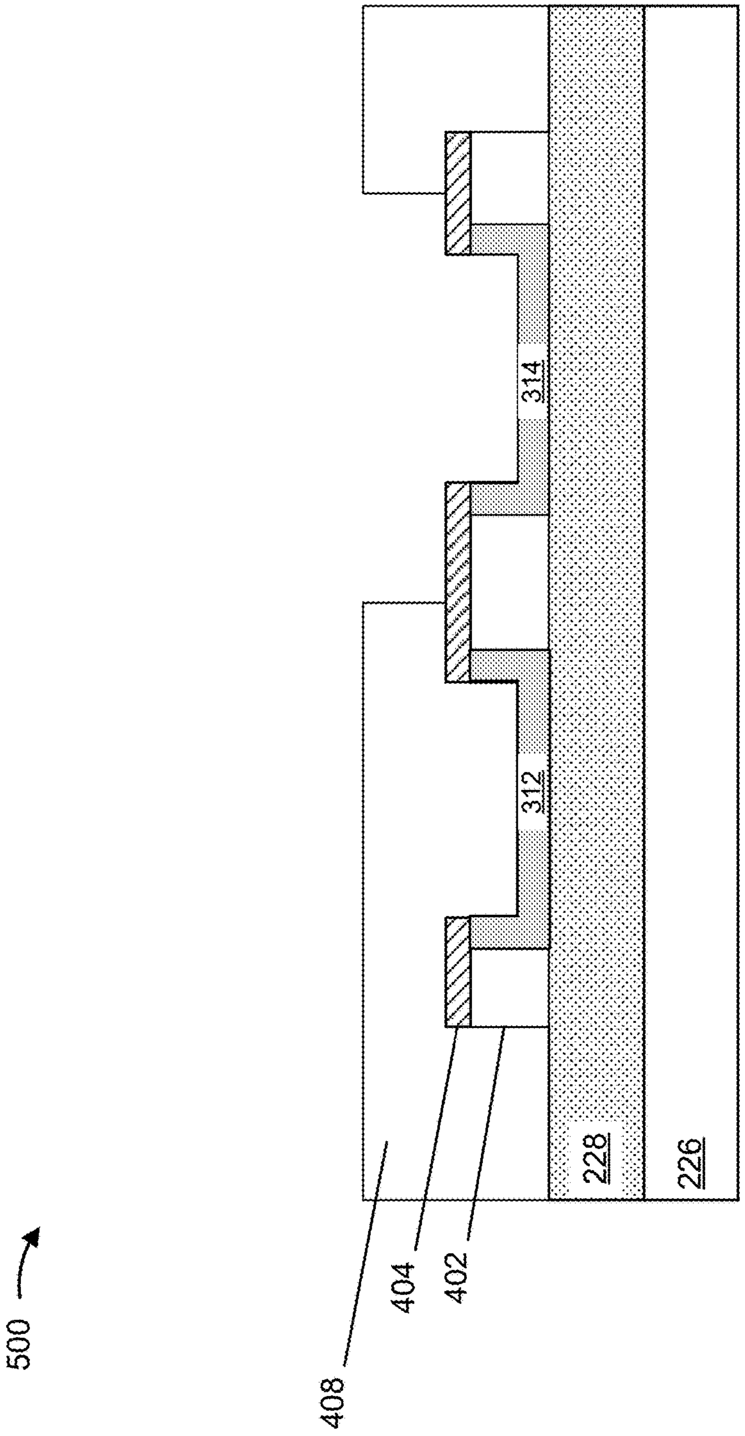
FIGS. 5A-5J are diagrams of an example implementation described herein.

As shown in FIG. 5A, the example implementation 500 may include processes described in connection with FIGS. 4A-4C. As further shown in FIG. 5A, another photoresist layer 408 may be formed over and/or on the dielectric region 228. A deposition tool 102 may form the photoresist layer 408 using a spin-coating technique and/or another type of deposition technique. An exposure tool 104 may expose the photoresist layer 408 to a radiation source, and a developer tool 106 may develop and remove portions of the photoresist layer 408 to pattern the photoresist layer 408 (e.g., as shown in FIG. 5A). The supporting region 312 may be covered by the photoresist layer 408 such that a second dopant type may be implanted into another region of the semiconductor layer 402.

As further shown in FIG. 5A, a portion of the semiconductor layer 402 may be doped with the second dopant type (e.g., one or more dopant materials classified in the second type) to form a doped semiconductor region. For example, an ion implantation tool 116 may perform one or more doping operations or ion implantation operations using a combination of the hard mask layer 404 and the photoresist layer 408 as an implantation mask. Accordingly, a supporting region 314 may be formed.

In some implementations, the second dopant type includes a p-type dopant such as boron (B). In these implementations, an implantation energy that is included in a range of approximately 20 keV to approximately 40 keV is used to implant boron ions into the semiconductor layer 402, and a dosage of the boron ions that is used may be included in a range of approximately $1\times10^{14}$ ions/$cm^3$ to approximately $5\times10^{14}$ ions/$cm^3$. However, other values for these ranges are within the scope of the present disclosure.

In some implementations, an ion implantation tool 116 bombards a surface of the semiconductor layer 402 at one or more angles to implant ions in exposed sidewalls of the semiconductor layer 402. Here, the implantation of ions in the sidewalls is self-aligned with the hard mask layer 404, meaning that the hard mask layer 404 functions as an implantation barrier. Ions may be implanted in the sidewalls at a tilt angle that is included in a range of approximately 45 degrees to approximately −45 degrees. However, other values for the range are within the scope of the present disclosure. The tilt angle may refer to an angle of bombardment relative to an approximately perpendicular angle to the substrate 226.

A photoresist removal tool may subsequently remove the remaining portions of the photoresist layer 408 (e.g., using a chemical stripper, plasma ashing, and/or another technique) after the supporting region 314 is formed.

Figure 5B:
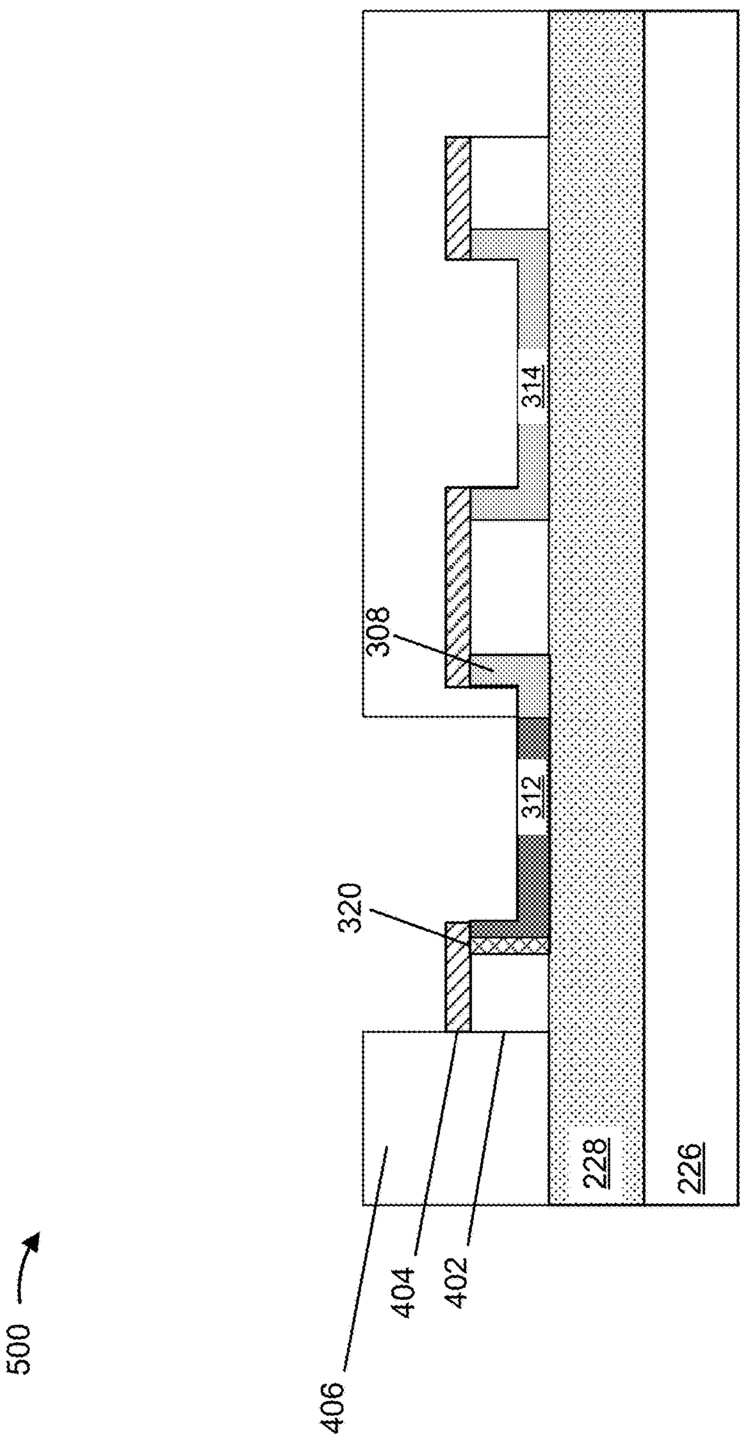

As shown in FIG. 5B, a carrier concentration may be increased in the supporting region 312. For example, an ion implantation tool 116 may implant additional n-type dopant material, such as phosphorous (P). In some implementations, an implantation energy that is included in a range of approximately 10 keV to approximately 30 keV is used to implant additional phosphorous ions into the semiconductor layer 402, and a dosage of the phosphorous ions that is used may be included in a range of approximately $1\times10^{14}$ ions/$cm^3$ to approximately $3\times10^{15}$ ions/$cm^3$. However, other values for these ranges are within the scope of the present disclosure. Additionally, the phosphorous ions may be implanted at a tilt angle that is included in a range of approximately 0 degrees to approximately 30 degrees. However, other values for the range are within the scope of the present disclosure.

As further shown in FIG. 5B, increasing the carrier concentration at the supporting region 312 results in a buffer region 320 (with a smaller doping concentration than the supporting region 312). Additionally, increasing the carrier concentration at the supporting region 312 results in a region 308 (with a smaller doping concentration than the supporting region 312).

The same mask (that is, the same photoresist layer 406) may be used to increase the carrier concentration as was used to form the supporting region 312. In some implementations, the photoresist layer 406 may be re-deposited and re-patterned after formation of the supporting region 314. A photoresist removal tool 114 may subsequently remove the remaining portions of the photoresist layer 406 (e.g., using a chemical stripper, plasma ashing, and/or another technique) after the carrier concentration is increased.

Figure 5C:
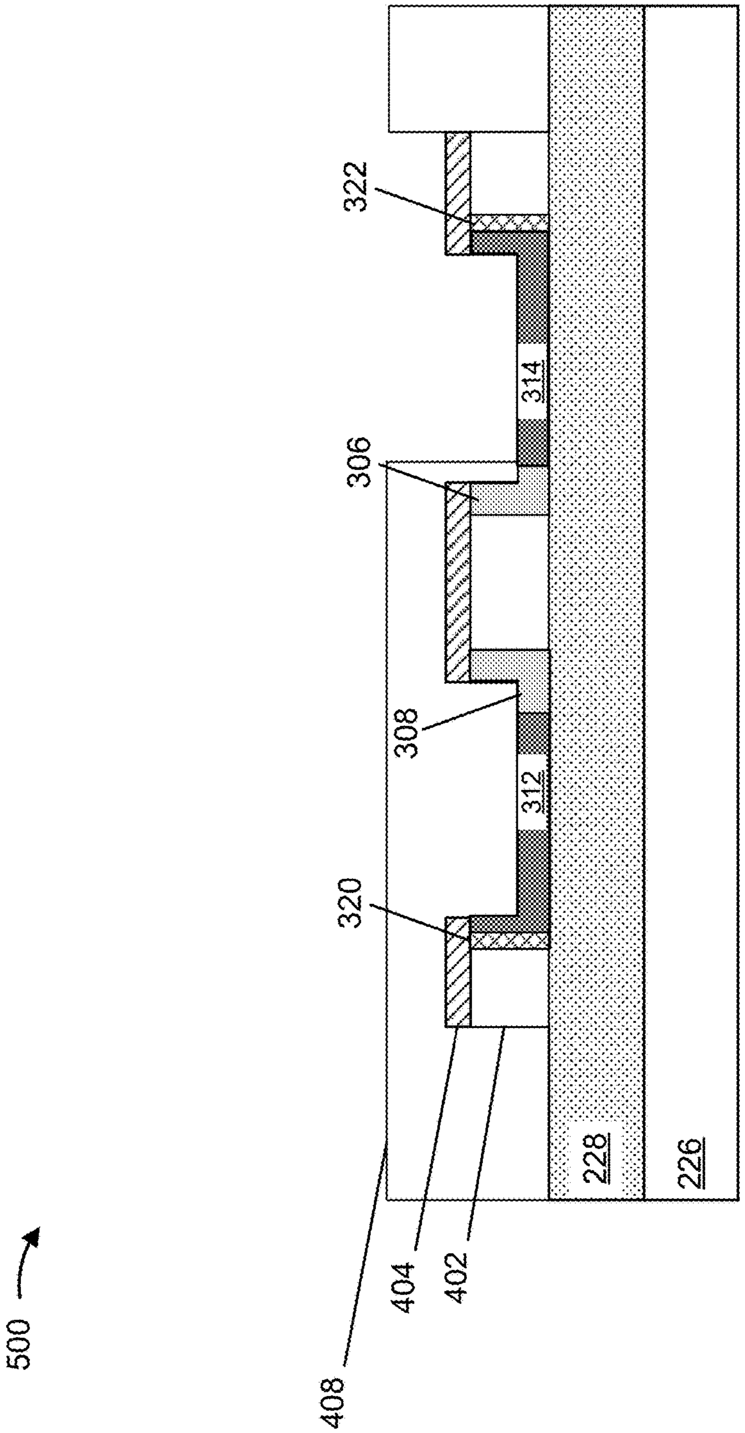

As shown in FIG. 5C, a carrier concentration may be increased in the supporting region 314. For example, an ion implantation tool 116 may implant additional p-type dopant material, such as boron (B). In some implementations, an implantation energy that is included in a range of approximately 10 keV to approximately 30 keV is used to implant additional boron ions into the semiconductor layer 402, and a dosage of the boron ions that is used may be included in a range of approximately $1\times10^{14}$ ions/$cm^3$ to approximately $3\times10^{15}$ ions/$cm^3$. However, other values for these ranges are within the scope of the present disclosure. Additionally, the boron ions may be implanted at a tilt angle that is included in a range of approximately 0 degrees to approximately 30 degrees. However, other values for the range are within the scope of the present disclosure.

As further shown in FIG. 5C, increasing the carrier concentration at the supporting region 314 results in a buffer region 322 (with a smaller doping concentration than the supporting region 314). Additionally, increasing the carrier concentration at the supporting region 314 results in a region 306 (with a smaller doping concentration than the supporting region 314). Therefore, by using two implantation operations to form the supporting region 314, a dopant gradient associated with the supporting region 314 is improved, which increases mobility of charge carriers.

The same mask (that is, the same photoresist layer 408) may be used to increase the carrier concentration as was used to form the supporting region 314. In some implementations, the photoresist layer 408 may be re-deposited and re-patterned after increasing carrier concentration in the supporting region 312. A photoresist removal tool 114 may subsequently remove the remaining portions of the photoresist layer 408 (e.g., using a chemical stripper, plasma ashing, and/or another technique) after the carrier concentration is increased.

Figure 5D:
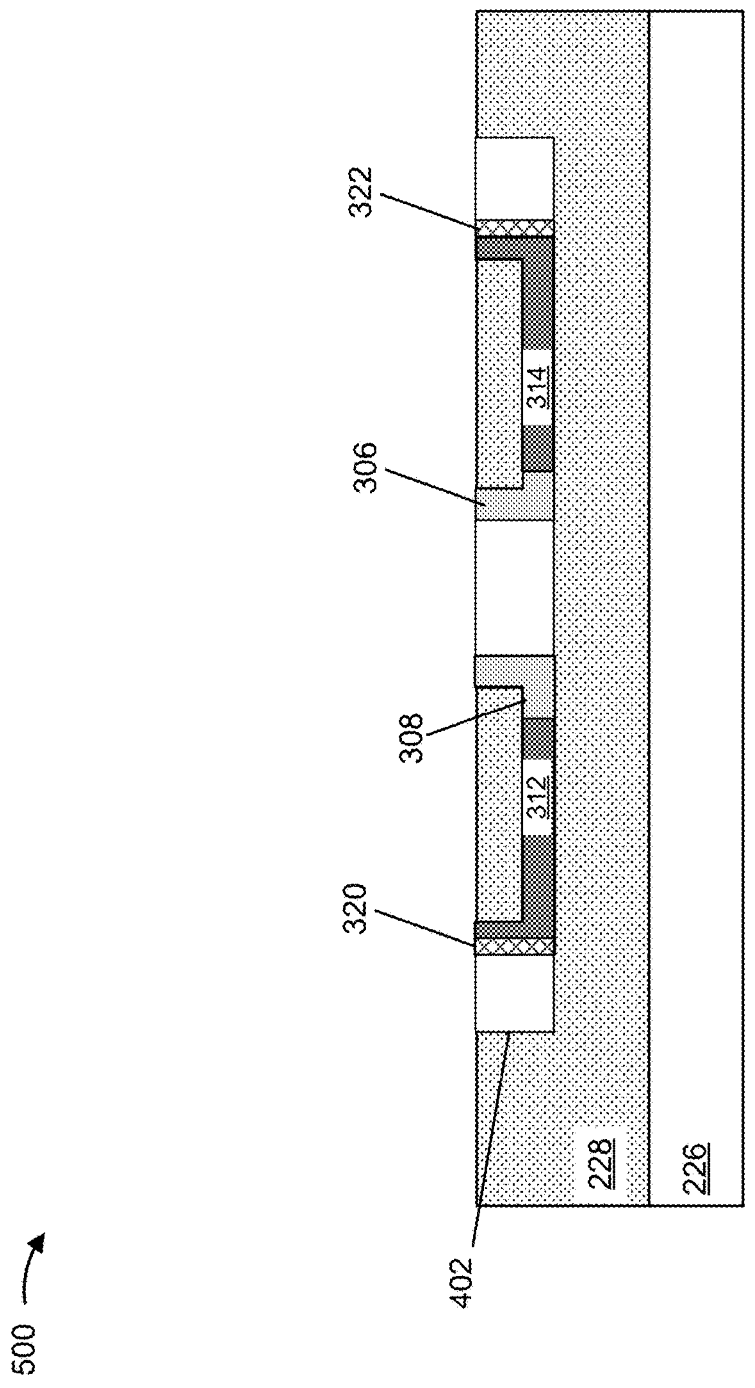

As shown in FIG. 5D, additional material for the dielectric region 228 may be deposited. For example, a deposition tool 102 may deposit the additional material for the dielectric region 228 using a CVD technique, a PVD technique, an oxidation technique (e.g., a thermal oxidation technique), and/or another type of deposition technique. In some implementations, an STI liner oxidation operation and/or an HDP deposition operation may be used to deposit the additional material of the dielectric region 228. In some implementations, a planarization tool 110 may perform a CMP operation and/or another type of planarization operation to planarize the dielectric region 228 after the additional material of the dielectric region 228 is deposited. The CMP operation may additionally remove the hard mask layer 404. Additionally and/or alternatively, an etch tool 108 may remove the hard mask layer 404 (e.g., using dry etching and/or wet/chemical etching).

Figure 5E:
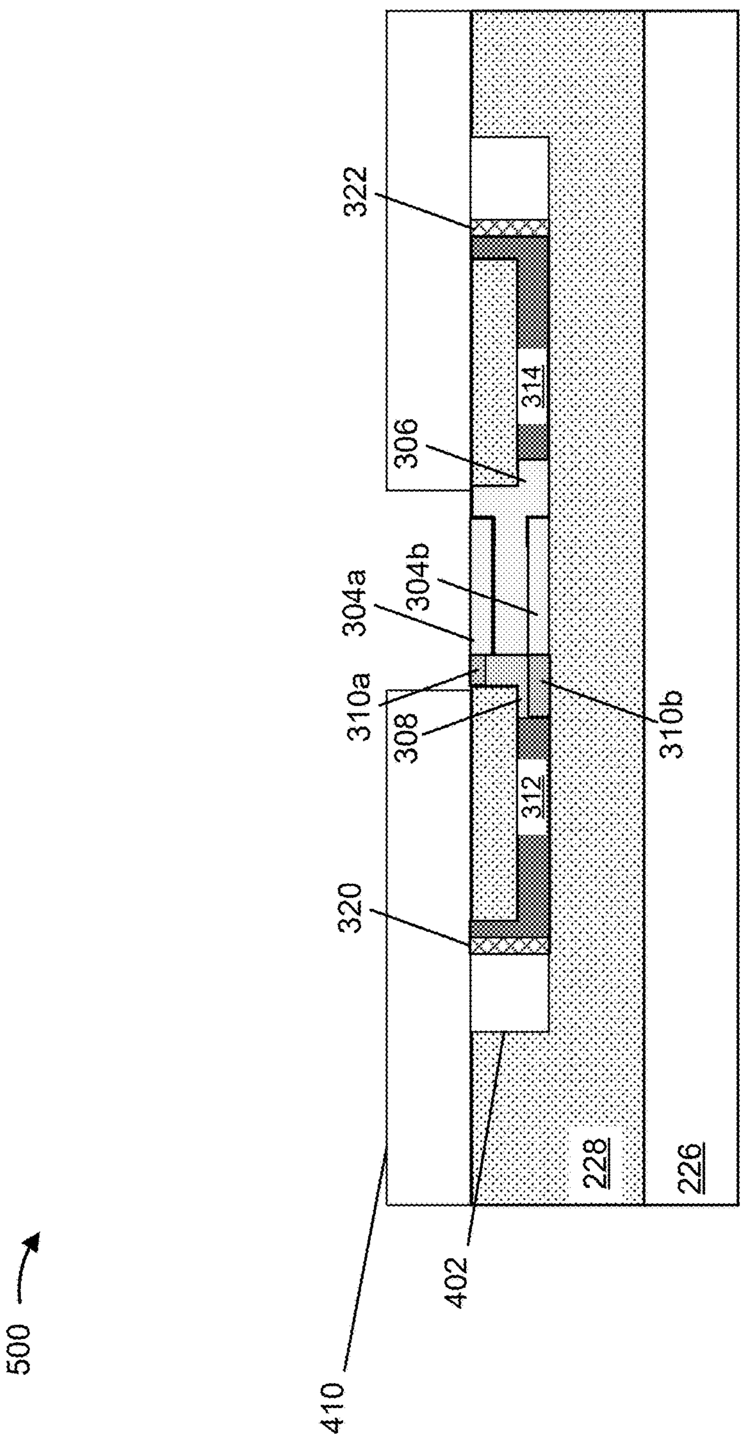

As shown in FIG. 5E, another photoresist layer 410 may be formed over and/or on the dielectric region 228. A deposition tool 102 may form the photoresist layer 410 using a spin-coating technique and/or another type of deposition technique. An exposure tool 104 may expose the photoresist layer 410 to a radiation source, and a developer tool 106 may develop and remove portions of the photoresist layer 410 to pattern the photoresist layer 410 (e.g., as shown in FIG. 5E). A portion of the semiconductor layer 402 that will be formed into a P-N junction diode may be exposed through the pattern of the photoresist layer 410.

As further shown in FIG. 5E, a portion of the semiconductor layer 402 may be doped with the first dopant type (e.g., one or more dopant materials classified in the first type) to form a doped semiconductor region. For example, an ion implantation tool 116 may perform one or more doping operations or ion implantation operations using the photoresist layer 410 as an implantation mask. Accordingly, a region 304*b* may be formed. As further shown in FIG. 5E, ion implantation to form the region 304*b* results in a region 310*b* (with a larger doping concentration than the region 308).

As shown in FIG. 5E, a portion of the semiconductor layer 402 may be doped with the second dopant type (e.g., p-type dopant material, such as boron (B)) to form a doped semiconductor region. For example, an ion implantation tool 116 may perform one or more doping operations or ion implantation operations using the photoresist layer 410 as an implantation mask. Additionally, an ion implantation tool 116 may implant additional p-type dopant material, such as indium (In). Accordingly, a region 306 may be formed.

In a third implantation operation, an ion implantation tool 116 may implant additional n-type dopant material. For example, an ion implantation tool 116 may perform one or more doping operations or ion implantation operations using the photoresist layer 410 as an implantation mask. Accordingly, a region 304*a* may be formed. As further shown in FIG. 5E, ion implantation to form the region 304*a* results in a region 310*a* (with a larger doping concentration than the region 308 caused by migration of ions from the region 304*a* into the region 310*a*).

A photoresist removal tool 114 may subsequently remove the remaining portions of the photoresist layer 410 (e.g., using a chemical stripper, plasma ashing, and/or another technique).

Figure 5F:
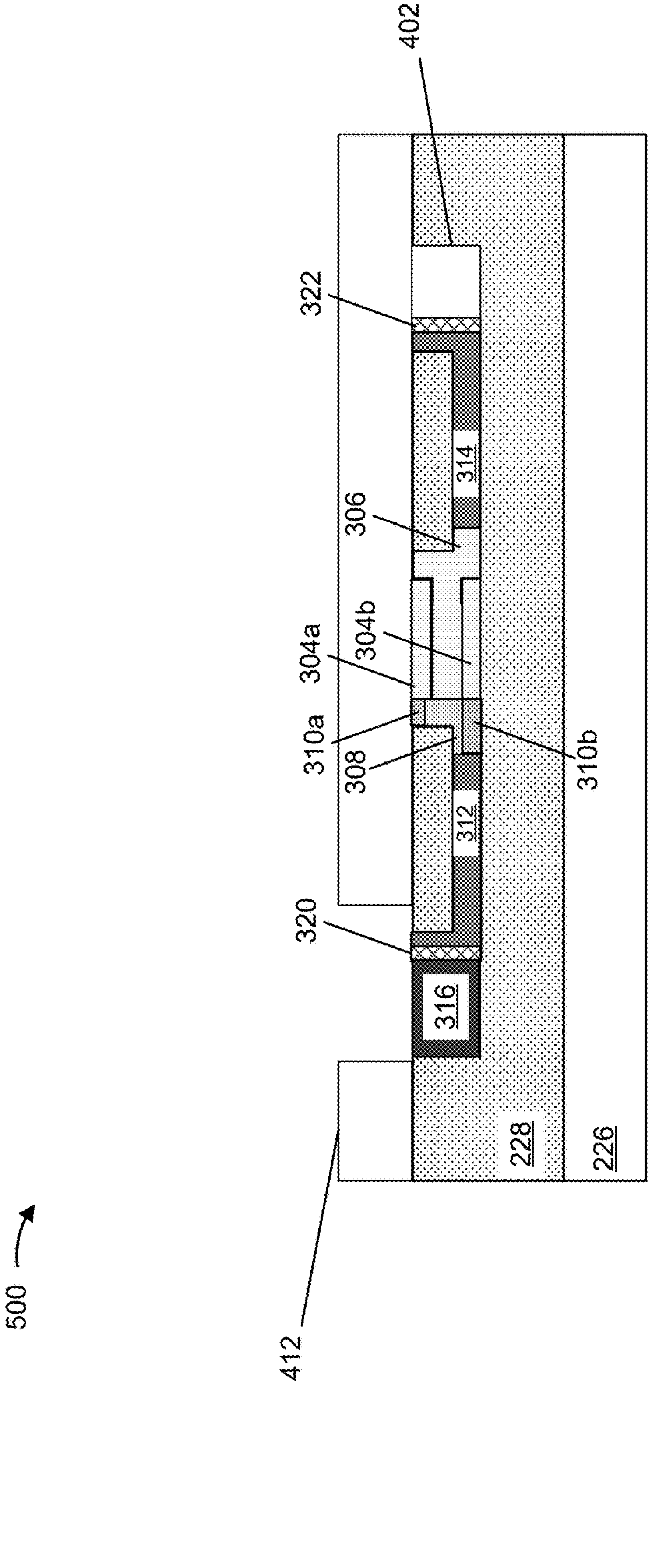

As shown in FIG. 5F, another photoresist layer 412 may be formed over and/or on the dielectric region 228. A deposition tool 102 may form the photoresist layer 412 using a spin-coating technique and/or another type of deposition technique. An exposure tool 104 may expose the photoresist layer 412 to a radiation source, and a developer tool 106 may develop and remove portions of the photoresist layer 412 to pattern the photoresist layer 412 (e.g., as shown in FIG. 5F). A portion of the semiconductor layer 402 that will be formed into a contact region may be exposed through the pattern of the photoresist layer 412.

As further shown in FIG. 5F, a portion of the semiconductor layer 402 may be doped with the first dopant type (e.g., one or more dopant materials classified in the first type) to form a doped semiconductor region. For example, an ion implantation tool 116 may perform one or more doping operations or ion implantation operations using the photoresist layer 412 as an implantation mask. Accordingly, a contact region 316 may be formed.

A photoresist removal tool may subsequently remove the remaining portions of the photoresist layer 412 (e.g., using a chemical stripper, plasma ashing, and/or another technique). In some implementations, an RTA operation and/or a furnace thermal activation operation is used to facilitate activation and/or absorption of dopants in the contact region 316.

Figure 5G:
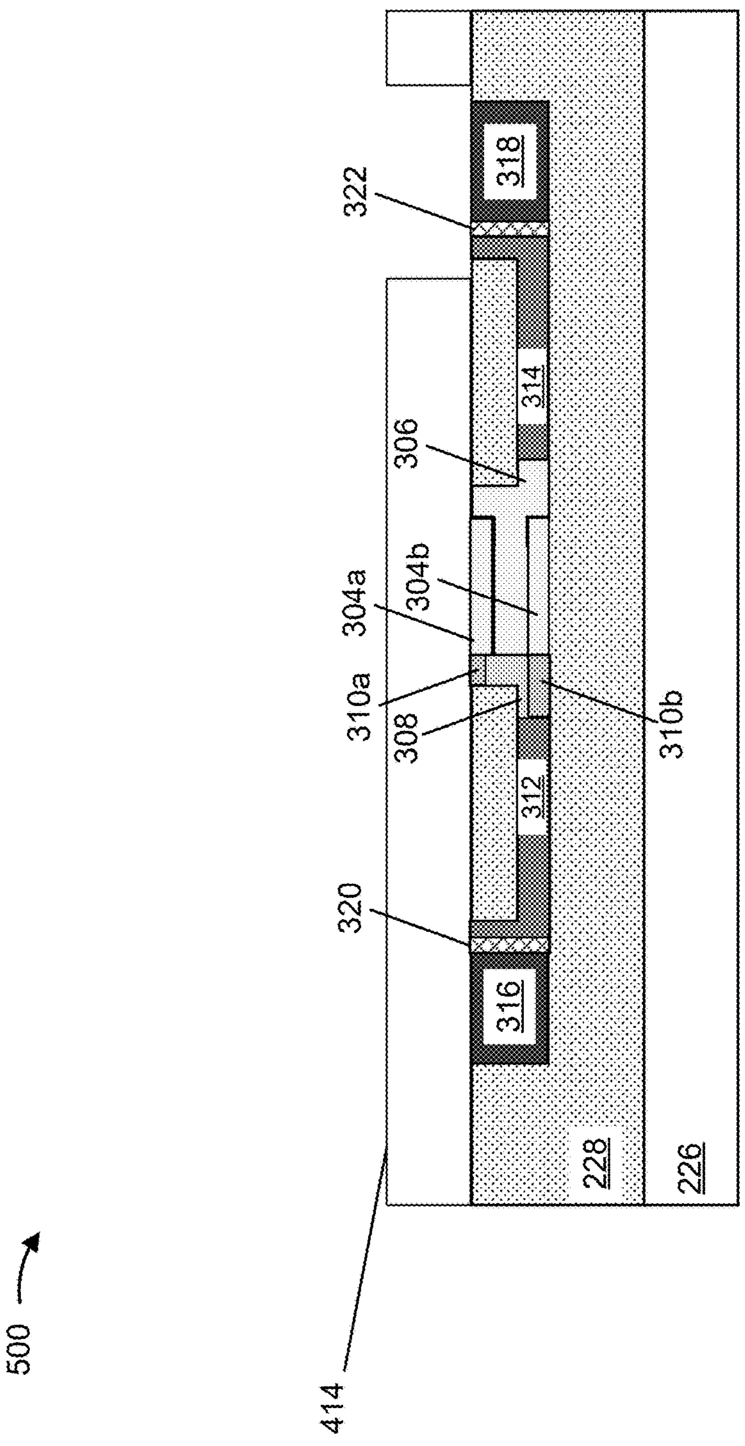

As shown in FIG. 5G, another photoresist layer 414 may be formed over and/or on the dielectric region 228. A deposition tool 102 may form the photoresist layer 414 using a spin-coating technique and/or another type of deposition technique. An exposure tool 104 may expose the photoresist layer 414 to a radiation source, and a developer tool 106 may develop and remove portions of the photoresist layer 414 to pattern the photoresist layer 414 (e.g., as shown in FIG. 5G). A portion of the semiconductor layer 402 that will be formed into a contact region may be exposed through the pattern of the photoresist layer 414.

As further shown in FIG. 5G, a portion of the semiconductor layer 402 may be doped with the second dopant type (e.g., one or more dopant materials classified in the second type) to form a doped semiconductor region. For example, an ion implantation tool 116 may perform one or more doping operations or ion implantation operations using the photoresist layer 414 as an implantation mask. Accordingly, a contact region 318 may be formed.

A photoresist removal tool may subsequently remove the remaining portions of the photoresist layer 414 (e.g., using a chemical stripper, plasma ashing, and/or another technique). In some implementations, an RTA operation and/or a furnace thermal activation operation is used to facilitate activation and/or absorption of dopants in the contact region 318.

Figure 5H:
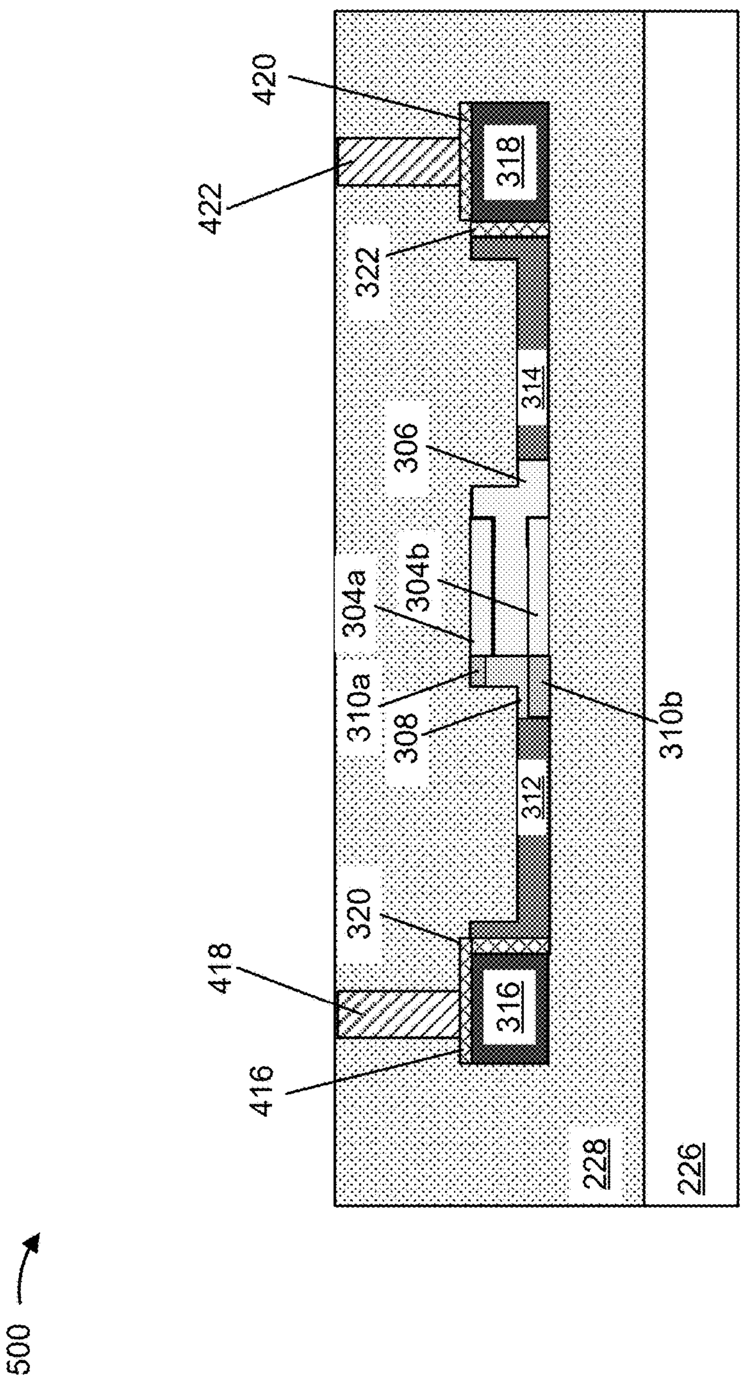

As shown in FIG. 5H, a silicide layer 416 may be formed over and/or on the top surface of the contact region 316, and a silicide layer 420 may be formed over and/or on the top surface of the contact region 318. The silicide layers 416 and 420 may be formed as described in connection with FIG. 4K.

As further shown in FIG. 5H, additional material for the dielectric region 228 may be deposited. For example, a deposition tool 102 may deposit the additional material for the dielectric region 228 using a CVD technique, a PVD technique, an oxidation technique (e.g., a thermal oxidation technique), and/or another type of deposition technique. In some implementations, a planarization tool 110 may perform a CMP operation and/or another type of planarization operation to planarize the dielectric region 228 after the additional material of the dielectric region 228 is deposited.

As shown in FIG. 5H, a contact structure 418 and a contact structure 422 may be formed in the dielectric region 228. The contact structures 418 and 422 may be formed as described in connection with FIG. 4K.

Figure 5I:
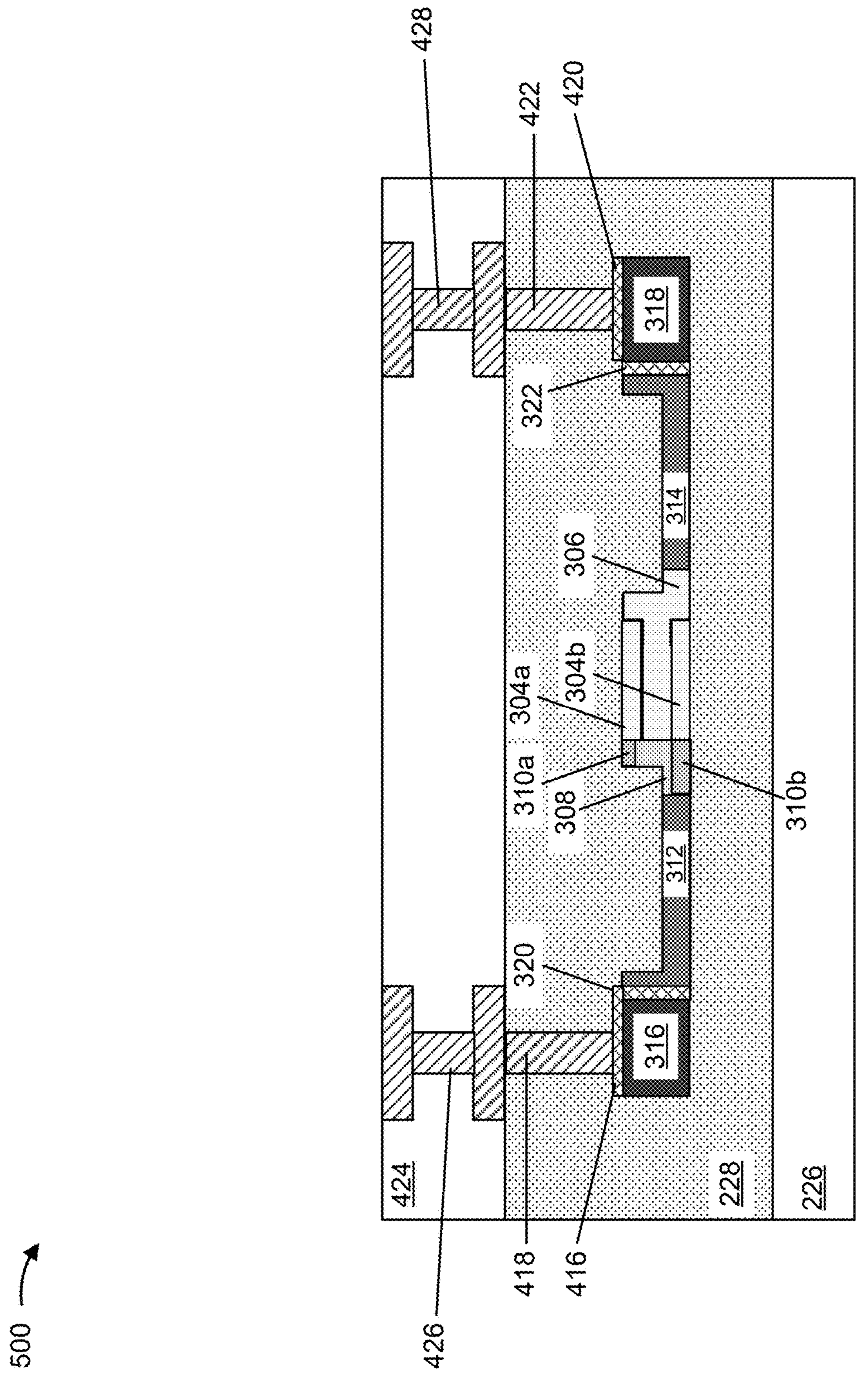

As shown in FIG. 5I, a dielectric region 424 may be formed over and/or on the dielectric region 228. For example, a deposition tool 102 may deposit the dielectric region 424 using a CVD technique, a PVD technique, an oxidation technique (e.g., a thermal oxidation technique), and/or another type of deposition technique.

As further shown in FIG. 5I, a metallization layer 426 and a metallization layer 428 may be formed in the dielectric region 424. The metallization layers 426 and 428 may be formed as described in connection with FIG. 4L.

Figure 5J:
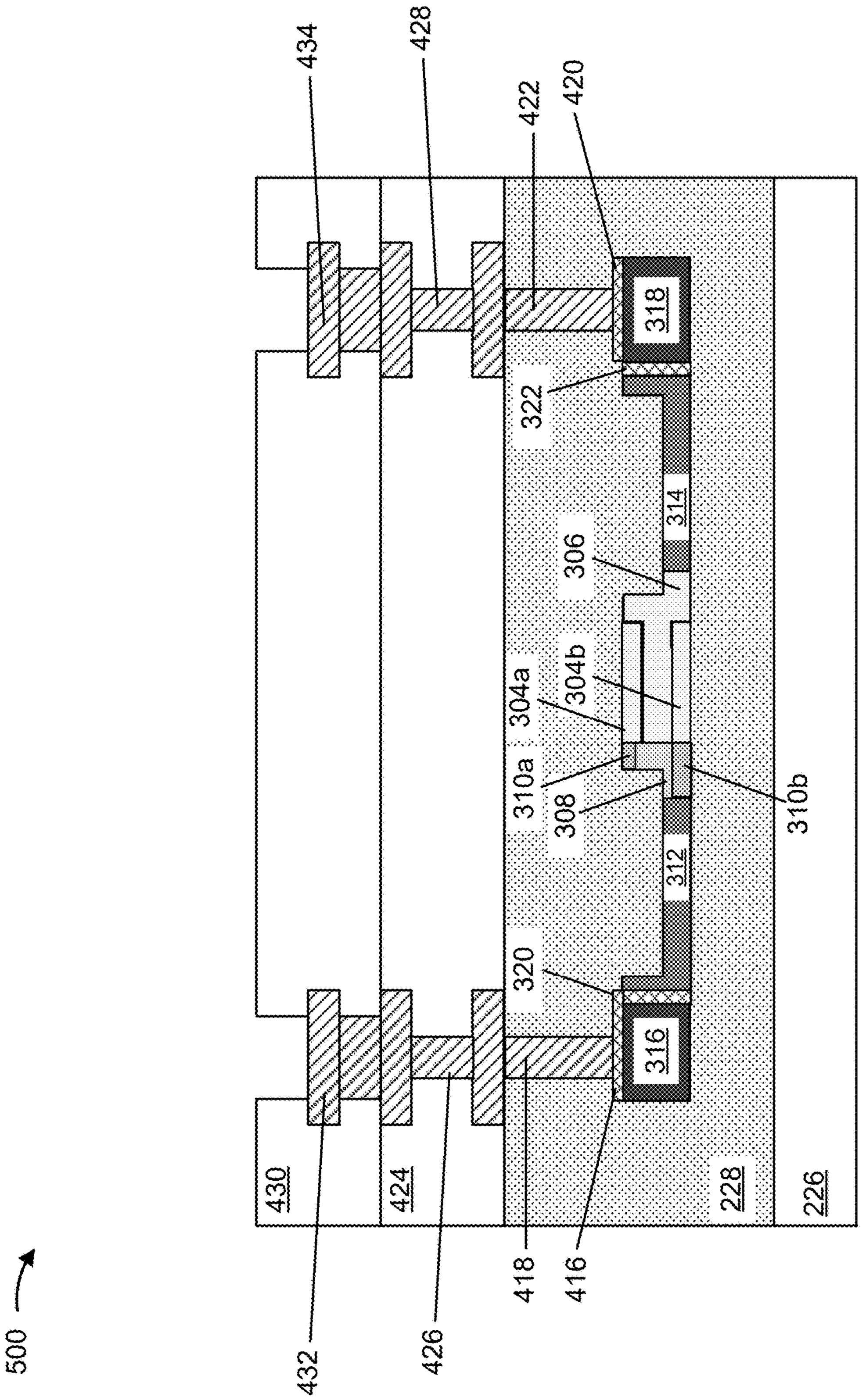

As shown in FIG. 5J, a dielectric region 430 may be formed over and/or on the dielectric region 424. For example, a deposition tool 102 may deposit the dielectric region 430 using a CVD technique, a PVD technique, an oxidation technique (e.g., a thermal oxidation technique), and/or another type of deposition technique.

As further shown in FIG. 5J, a metallization layer 432 and a metallization layer 434 may be formed in the dielectric region 430. The metallization layers 432 and 434 may be formed as described in connection with FIG. 4M.

Additional dielectric regions and/or additional metallization layers may be formed until a sufficient or target quantity of metallization layers is formed.

As indicated above, FIGS. 5A-5J are provided as an example. Other examples may differ from what is described with regard to FIGS. 5A-5J.

Figure 6:
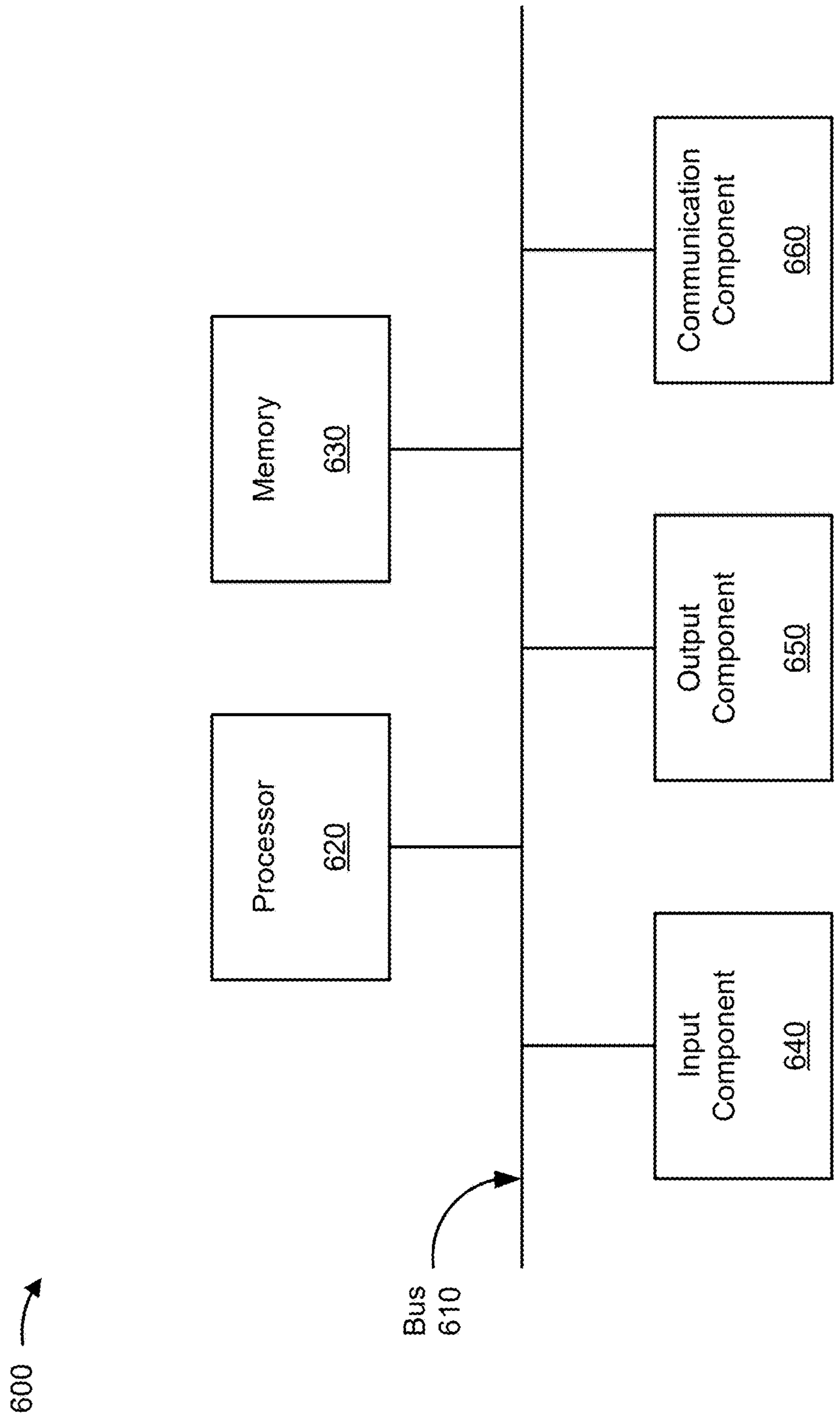
FIG. 6 is a diagram of example components of one or more devices of FIG. 1 described herein.

FIG. 6 is a diagram of example components of a device 600 described herein. In some implementations, one or more of the semiconductor processing tools 102-116 and/or the wafer/die transport tool 118 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
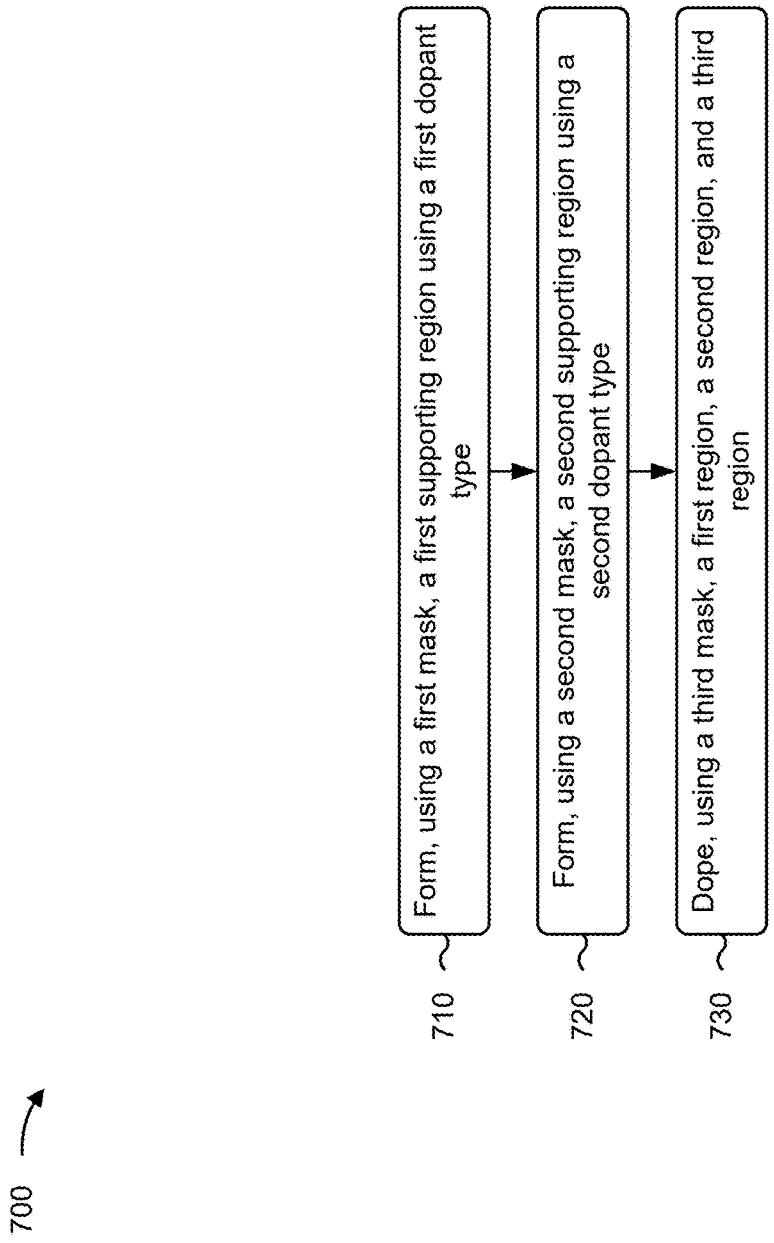
FIG. 7 is a flowchart of an example process associated with forming a semiconductor structure described herein.

FIG. 7 is a flowchart of an example process 700 associated with forming a semiconductor photonics device. In some implementations, one or more process blocks of FIG. 7 are performed using one or more semiconductor processing tools (e.g., one or more of the semiconductor processing tools 102-116). Additionally, or alternatively, one or more process blocks of FIG. 7 may be performed using one or more components of device 600, such as processor 620, memory 630, input component 640, output component 650, and/or communication component 660.

As shown in FIG. 7, process 700 may include forming, using a first mask, a first supporting region using a first dopant type (block 710). For example, one or more of the semiconductor processing tools 102-116 may be used to form, using a first mask (e.g., a photoresist layer 406), a first supporting region 312 using a first dopant type, as described herein.

As further shown in FIG. 7, process 700 may include forming, using a second mask, a second supporting region using a second dopant type (block 720). For example, one or more of the semiconductor processing tools 102-116 may be used to form, using a second mask (e.g., a photoresist layer 408), a second supporting region 314 using a second dopant type, as described herein.

As further shown in FIG. 7, process 700 may include doping, using a third mask, a first region, a second region, and a third region (block 730). For example, one or more of the semiconductor processing tools 102-116 may be used to dope, using a third mask (e.g., a photoresist layer 410), a first region **304*a*, a second region 306, and a third region 304*b*, as described herein. The first region 304*a* may be doped with the first dopant type, the second region 306 may be under the first region 304*a* and may be doped with the second dopant type, and the third region 304*b* may be under the second region 306 and may be doped with the first dopant type. The first region 304*a*, the second region 306, and the third region 304*b* correspond to a P-N junction diode and form a U-shaped interface 302** of the P-N junction diode.

Process 700 may include additional implementations, such as any single implementation or any combination of implementations described below and/or in connection with one or more other processes described elsewhere herein.

In a first implementation, doping the third region **304*b* includes doping the third region 304*b* using a greater implantation energy than used in doping the second region 306 or doping the first region 304*a***.

In a second implementation, alone or in combination with the first implementation, doping the second region 306 includes doping a first portion of the second region 306 using a first implantation energy and doping a second portion of the second region 306 using a second implantation energy.

In a third implementation, alone or in combination with one or more of the first and second implementations, doping the second region 306 includes doping a first portion of the second region 306 using a first dopant material and doping a second portion of the second region 306 using a second dopant material.

In a fourth implementation, alone or in combination with one or more of the first through third implementations, forming the first supporting region 312 includes doping the first supporting region 312 using a first dopant material and doping the first supporting region 312 using a second dopant material.

In a fifth implementation, alone or in combination with one or more of the first through fourth implementations, forming the second supporting region 314 includes doping the second supporting region 314 in a first implantation operation and increasing a carrier concentration in the second supporting region 314 using a second implantation operation after the first implantation operation.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

In this way, an optical modulator structure in a photonic integrated circuit includes a U-shaped P-N junction at an optical mode of the optical modulator structure (e.g., an area of the optical modulator structure in which light is generated). The U-shaped P-N junction includes a first portion that includes a first dopant type (e.g., a p-type dopant or an n-type dopant) that overlaps a second portion that includes a second dopant type different from the first dopant type. A first segment of the second portion contacts a bottom surface of the first portion, a second segment of the second portion contacts a side surface of the first portion, and a third segment of the second portion contacts a top surface of the first portion. The U-shaped P-N junction provides increased area of overlap of the P-N junction at the optical mode relative to another type of junction, such as a horizontal junction or an I-shaped junction. The increased area of overlap enables the optical modulator structure to achieve a greater modulation efficiency.

As described in greater detail above, some implementations described herein provide a semiconductor device. The semiconductor device includes a dielectric layer. The semiconductor device includes an optical modulator structure, in the dielectric layer. The optical modulator structure includes a first region including a first dopant type. The optical modulator structure includes a second region, on a bottom surface of the first region, including a second dopant type. The optical modulator structure includes a third region, on a bottom surface of the second region, including the first dopant type. The first region, the second region, and the third region correspond to a P-N junction diode of the optical modulator structure.

As described in greater detail above, some implementations described herein provide a method. The method includes forming, using a first mask, a first supporting region using a first dopant type. The method includes forming, using a second mask, a second supporting region using a second dopant type. The method includes doping, using a third mask: a first region with the first dopant type; a second region with the second dopant type, where the second region is under the first region; and a third region with the first dopant type, where the third region is under the second region. The first region, the second region, and the third region correspond to a P-N junction diode, and the first region, the second region, and the third region form a U-shaped interface of the P-N junction diode.

As described in greater detail above, some implementations described herein provide a semiconductor structure. The semiconductor structure includes a dielectric layer. The semiconductor structure includes an optical modulator structure, in the dielectric layer. The optical modulator structure includes a first portion of a P-N junction diode of the optical modulator structure, where the first portion includes a first dopant type. The optical modulator structure includes a second portion of the P-N junction diode, where the second portion includes a second dopant type. The second portion includes a first segment in contact with a bottom surface of the first portion, a second segment in contact with a side surface of the first portion, and a third segment in contact with a top surface of the first portion.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
- a dielectric layer; and
- an optical modulator structure, in the dielectric layer, comprising:
  - a first region including a first dopant type;
  - a second region, on a bottom surface of the first region, including a second dopant type;
  - a third region, on a bottom surface of the second region, including the first dopant type,
    - wherein the first region, the second region, and the third region correspond to a P-N junction diode of the optical modulator structure; and
  - a supporting region, including the first dopant type, connecting the first region and the third region to a first contact via a buffer region,
    - wherein a doping concentration of the buffer region is smaller than a doping concentration of the supporting region,
    - wherein the doping concentration of the supporting region is smaller than a doping concentration of the first contact, and
    - wherein the buffer region is disposed between the supporting region and the first contact.

2. The semiconductor device of claim 1, further comprising:
- a second supporting region, including the second dopant type, connecting the second region to a second contact.

3. The semiconductor device of claim 2,
wherein the buffer region is a first buffer region,
wherein the second supporting region is connected to the second contact via a second buffer region, and
wherein a doping concentration of the second buffer region is smaller than a doping concentration of the second supporting region.

4. The semiconductor device of claim 1, wherein the first dopant type comprises at least one p-type dopant, and the second dopant type comprises at least one n-type dopant.

5. The semiconductor device of claim 1, wherein the first dopant type comprises at least one n-type dopant, and the second dopant type comprises at least one p-type dopant.

6. The semiconductor device of claim 1, wherein the optical modulator structure comprises a micro-ring modulator (MRM) structure.

7. The semiconductor device of claim 1, wherein the optical modulator structure comprises a Mach-Zehnder modulator (MZM) structure.

8. A method, comprising:
forming, using a first mask, a first supporting region using a first dopant type, wherein forming the first supporting region comprises:
doping the first supporting region in a first implantation operation;
increasing a carrier concentration in the first supporting region using a second implantation operation after the first implantation operation; and
forming a buffer region based on increasing the carrier concentration in the first supporting region,
wherein a doping concentration of the buffer region is smaller than a doping concentration of the first supporting region;
forming, using a second mask, a second supporting region using a second dopant type;
doping, using a third mask:
a first region with the first dopant type,
a second region with the second dopant type,
wherein the second region is under the first region; and
a third region with the first dopant type,
wherein the third region is under the second region,
wherein the first region, the second region, and the third region correspond to a P-N junction diode, and
wherein the first region, the second region, and the third region form a U-shaped interface of the P-N junction diode; and
forming, using a fourth mask, a contact region,
wherein the doping concentration of the supporting region is smaller than a doping concentration of the contact region, and
wherein the buffer region is disposed between the supporting region and the contact region.

9. The method of claim 8, wherein doping the third region comprises:
doping the third region using a greater implantation energy than used in doping the second region or doping the first region.

10. The method of claim 8, wherein doping the second region comprises:
doping a first portion of the second region using a first implantation energy; and
doping a second portion of the second region using a second implantation energy.

11. The method of claim 8, wherein doping the second region comprises:
doping a first portion of the second region using a first dopant material; and
doping a second portion of the second region using a second dopant material.

12. The method of claim 8, wherein forming the first supporting region comprises:
doping the first supporting region using a first dopant material; and
doping the first supporting region using a second dopant material.

13. The method of claim 8, wherein forming the second supporting region comprises:
doping the second supporting region in a third implantation operation; and
increasing a carrier concentration in the second supporting region using a fourth implantation operation after the third implantation operation.

14. A semiconductor structure, comprising:
a dielectric layer; and
an optical modulator structure, in the dielectric layer, comprising:
a first portion of a P-N junction diode of the optical modulator structure,
wherein the first portion includes a first dopant type;
a second portion of the P-N junction diode,
wherein the second portion includes a second dopant type, and
wherein the second portion comprises:
a first segment in contact with a bottom surface of the first portion;
a second segment in contact with a side surface of the first portion; and
a third segment in contact with a top surface of the first portion;
a contact region electrically connected to the second portion;
a supporting region, including the second dopant type, connecting the second portion to the contact region; and
a buffer region between the contact region and the supporting region,
wherein a doping concentration of the buffer region is smaller than a doping concentration of the supporting region, and
wherein the doping concentration of the supporting region is smaller than a doping concentration of the contact region.

15. The semiconductor structure of claim 14, further comprising:
a U-shaped interface between the first portion and the second portion.

16. The semiconductor structure of claim 14, wherein a thickness of the first portion is greater relative to a thickness of the first segment and the third segment.

17. The semiconductor structure of claim 14, wherein a thickness of the first segment is greater relative to a thickness of the third segment.

18. The semiconductor structure of claim 14, further comprising:
a first contact region electrically connected to the first portion of the P-N junction diode,
wherein the contact region electrically connected to the second portion is a second contact region; and
a first supporting region, including the first dopant type, connecting the first portion to the first contact region, wherein the supporting region connecting the second portion to the second contact region is a second supporting region.

19. The semiconductor structure of claim 18, further comprising:

a first buffer region between the first contact region and the first supporting region, wherein the buffer region between the second contact region and the second supporting region is a second buffer region.

20. The semiconductor structure of claim 19, wherein a doping concentration of the first buffer region is smaller than a doping concentration of the first supporting region.

* * * * *